(12) United States Patent  
Terahara et al.

(10) Patent No.: US 7,415,182 B2  
(45) Date of Patent: Aug. 19, 2008

(54) OPTICAL FIBER CABLE

(75) Inventors: Takafumi Terahara, Kawasaki (JP); Rainer Hainberger, Kawasaki (JP); Takeshi Hoshida, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/480,857

(22) Filed: Jul. 6, 2006

(65) Prior Publication Data

US 2006/0251364 A1    Nov. 9, 2006

Related U.S. Application Data

(62) Division of application No. 11/066,537, filed on Feb. 28, 2005, now Pat. No. 7,099,541, which is a division of application No. 10/755,384, filed on Jan. 13, 2004, now Pat. No. 6,934,454, which is a division of application No. 09/984,489, filed on Oct. 30, 2001, now Pat. No. 6,721,481.

(30) Foreign Application Priority Data

Oct. 30, 2000    (JP)    ............... 2000-330966

(51) Int. Cl.  
*G02B 6/44* (2006.01)  
*G02B 6/02* (2006.01)

(52) U.S. Cl. ...................... 385/100; 385/123

(58) Field of Classification Search .......... 385/100, 385/111, 122  
See application file for complete search history.

(56) References Cited

U.S. PATENT DOCUMENTS

| 5,191,631 A | 3/1993 | Rosenberg ............ 385/123 |
| 5,504,829 A | 4/1996 | Evans et al. .......... 385/123 |
| 5,611,016 A | 3/1997 | Fangmann et al. ..... 385/100 |
| 5,612,807 A | 3/1997 | Ishikawa et al. ...... 359/161 |

(Continued)

FOREIGN PATENT DOCUMENTS

EP    0 790 510    8/1997

(Continued)

OTHER PUBLICATIONS

Chraplyvy, A.R., et al., "8×10 Gb/s Transmission Through 280 km of Dispersion-Managed Fiber," IEEE Photonics Technology Letters, vol. 5, No. 10, Oct. 1993, pp. 1233-1235.

(Continued)

*Primary Examiner*—Tina M Wong  
(74) *Attorney, Agent, or Firm*—Staas & Halsey LLP

(57) ABSTRACT

An optical fiber cable including first, second and third optical fibers connected together so that light traveling through the cable travels through the first optical fiber, then through the second optical fiber and then through the third optical fiber. The second optical fiber has a negative dispersion value. The first and third optical fibers each have a positive dispersion value. The cable optically connects together two optical repeater stations, or an optical repeater station and an end station. Lengths of the first, second and third optical fibers are set so that loss in the first, second and third optical fibers of light transmitted through the first, second and third optical fibers is compensated by Raman amplification occurring in the first, second and third optical fibers.

5 Claims, 20 Drawing Sheets

U.S. PATENT DOCUMENTS

| | | | | |
|---|---|---|---|---|
| 5,778,128 | A | * | 7/1998 | Wildeman .................. 385/123 |
| 5,838,867 | A | | 11/1998 | Onishi et al. ............... 385/123 |
| 5,898,714 | A | | 4/1999 | Morita et al. .................. 372/6 |
| 5,960,146 | A | | 9/1999 | Okuno et al. ............... 385/122 |
| 5,999,548 | A | | 12/1999 | Mori et al. .................... 372/22 |
| 6,084,993 | A | | 7/2000 | Mukasa ....................... 385/24 |
| 6,157,754 | A | | 12/2000 | Sasaoka et al. ............... 385/24 |
| 6,307,984 | B1 | | 10/2001 | Watanabe .................... 385/24 |
| 6,307,985 | B1 | | 10/2001 | Murakami et al. ............ 385/24 |
| 6,404,964 | B1 | | 6/2002 | Bhagavatula et al. ........ 385/123 |
| 6,421,484 | B2 | | 7/2002 | Tanaka et al. ............... 385/100 |
| 6,424,774 | B1 | | 7/2002 | Takeda et al. ............... 385/122 |
| 6,512,628 | B1 | | 1/2003 | Terahara et al. ............. 359/334 |
| 6,522,818 | B1 | | 2/2003 | Aso et al. .................... 385/122 |
| 6,526,208 | B1 | | 2/2003 | King et al. ................... 385/123 |
| 6,535,677 | B1 | | 3/2003 | Tanaka et al. ............... 385/123 |
| 6,721,481 | B2 | | 4/2004 | Terahara et al. ............. 385/122 |
| 6,728,452 | B2 | | 4/2004 | Nishimura .................. 385/100 |
| 6,731,837 | B2 | | 5/2004 | Goldberg et al. .............. 385/27 |
| 6,754,420 | B2 | * | 6/2004 | Tsuritani et al. ............. 385/123 |
| 6,782,175 | B2 | | 8/2004 | Bickham et al. ............ 385/123 |

FOREIGN PATENT DOCUMENTS

| | | |
|---|---|---|
| EP | 0862078 | 9/1998 |
| EP | 1 087 549 | 3/2001 |
| JP | 9-318824 | 12/1997 |
| JP | A 9-318824 | 12/1997 |
| WO | WO 99/57822 | 11/1999 |
| WO | 00/60775 | 10/2000 |

OTHER PUBLICATIONS

Kurtzke, Christian, "Suppression of Fiber Nonlinearities by Appropriate Dispersion Management," IEEE Photonics Technology Letters, vol. 5, No. 10, Oct. 1993, pp. 1250-1253.

Henmi, N., et al., "An Arrangement of Transmission-Fiber Dispersions for Increasing the Spacing Between Optical Amplifiers in Lumped Repeater Systems," IEEE Photonics Tecnology Letters, vol. 5, No. 11, Nov. 1993, pp. 1337-1340.

Okuno, Tashiaki, et al., "Novel Lossless Optical Transmission Line with Distributed Raman Amplification," Proceedings of the 2000 Communications Society Conference of IEICE, B-10-116, with English translation.

Smith, N.J., et al., "Energy-scaling characteristics of solitons in strongly dispersion-managed fibers," Optics Letters, vol. 21, No. 24, Dec. 15, 1996, pp. 1981-1983.

Morita, I., et al.. "40 GBIT/S×16 WDM Transmission Over 2000 KM Using Dispersion Managed Low-Nonlinear Fiber Span," ECOC 2000, 26th European Conference on Optical Communication, Munich, Germany, Sep. 3-7, 2000, vol. 4, pp. 25-26.

Mukasa, K., et al., "Wide-Band Dispersion Management Transmission Line With Medial Dispersion Fiber (MDF)," ECOC 2000, 26th European Conference on Optical Communication, Munich, Germany, Sep. 3-7, 2000, vol. 1, pp. 95-96.

Grüner-Nielsen, Lars, et al., "Dispersion Compensating Fibres and Perspectives For Future Developments," ECOC 2000, 26th European Conference on Optical Communication, Munich, Germany, Sep. 3-7, 2000, vol. 1, pp. 91-96.

Okuno, Toshiaki, et al., "Novel Lossless Optical Transmission Line with Distributed Raman Amplification," ECOC 2000, 26th European Conference on Optical Communication, Munich, Germany, Sep. 3-7, 2000, vol. 2, pp. 75-76.

Ohhira, R., et al., "40 Gbit/s×8-ch NRZ WDM Transmission Experiment Over 80 km×5-Span Using Distributed Raman Amplification in RDF," ECOC'99, Sep. 26-30, 1999, Nice, France, pp. II-176, II-177.

Smith, N.J., et al., "Enhanced power solitons in optical fibres with periodic dispersion management," Electronics Letters, Jan. 4, 1996, vol. 32, No. 1, pp. 54-55.

Henmi, N., et al., "A New Design Arrangement of Transmission Fiber Dispersion for Suppressing Nonlinear Degradation in Long-Distance Transmission Systems with Optical Repeater Amplifiers," Journal of Lightwave Technology, vol. 11, No. 10, Oct. 1993, pp. 1615-1621.

* cited by examiner $$\frac{n_2(z)}{A_{eff}(z)}\bigg|_{\text{optical transmission line 102-A}} < \frac{n_2(z)}{A_{eff}(z)}\bigg|_{\text{optical transmission line 102-B}}$$

fusing

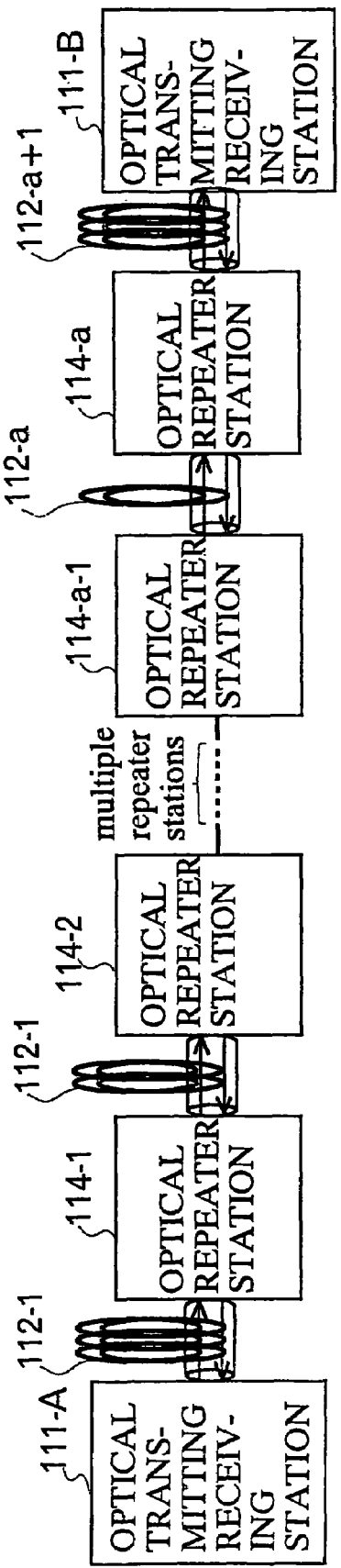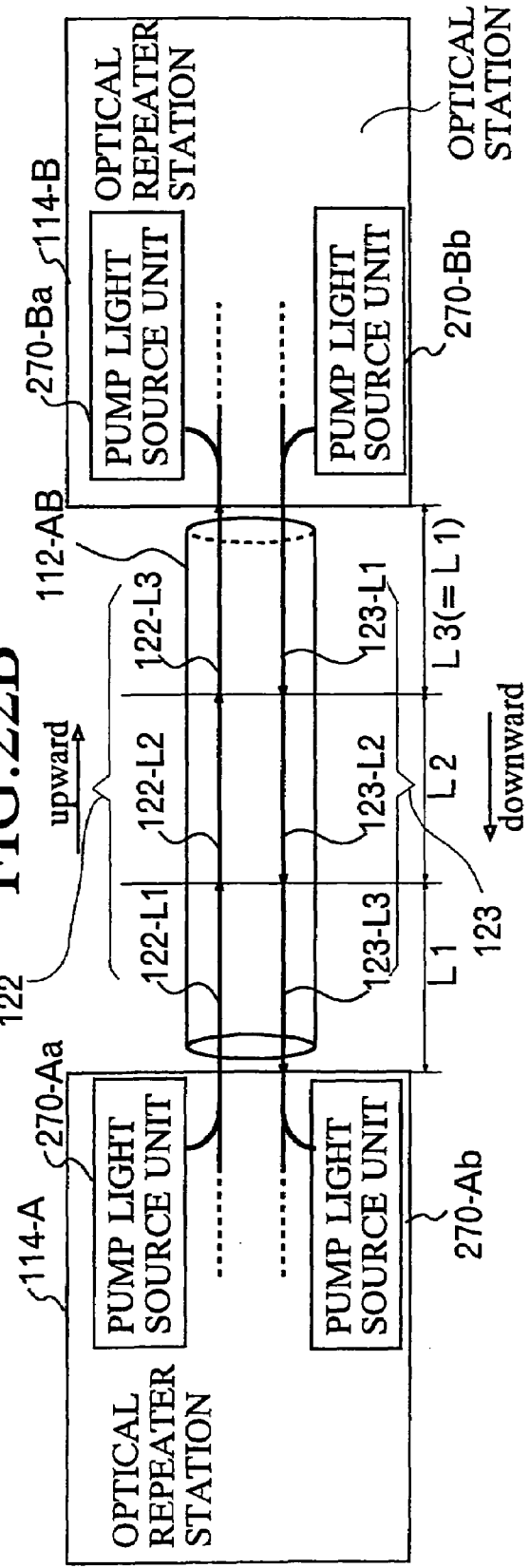
FIG.22A
FIG.22B

OPTICAL FIBER CABLE

This application is a divisional of application Ser. No. 11/066,537, filed Feb. 28, 2005, now U.S. Pat. No. 7,099,541, which is a divisional of application Ser. No. 10/755,384, filed Jan. 13, 2004, now U.S. Pat. No. 6,934,454, issued Aug. 23, 2005, which is a divisional of application Ser. No. 09/984,489, filed Oct. 30, 2001, now U.S. Pat. No. 6,721,481, issued Apr. 13, 2004.

CROSS-REFERENCE TO RELATED APPLICATIONS

This application claims priority to Japanese application No. 2000-330966, filed Oct. 30, 2000, and which is incorporated herein by reference.

BACKGROUND OF THE INVENTION

1. Field of the Invention

The present invention relates to a distributed optical amplifying apparatus which can serve both as an optical transmission line and an optical amplifying medium, and more particularly, to a distributed optical amplifying apparatus which can compensate transmission loss, prevent a nonlinear optical effect, and improve an optical signal-to-noise ratio. Moreover, the present invention relates to an optical fiber cable suitable for the distributed optical amplifying apparatus, an optical communication station including the distributed optical amplifying apparatus, and an optical communication system including the distributed optical amplifying apparatus.

2. Description of the Related Art

Optical communication systems will be used in future multimedia networks, as advances in optical communication technology should enable the high bandwidth, high capacity, ultra long distance transmission required by such future multimedia networks. Wavelength division multiplexing (hereinafter abbreviated to 'WDM') is a significant optical communication technology being developed for this purpose, as WDM effectively utilizes the broadband characteristics and large capacity of an optical fiber.

More specifically, in WDM optical communication systems, a plurality of optical signals at different wavelengths are multiplexed together into a WDM optical signal. This WDM optical signal is then transmitted through a single optical fiber as an optical transmission line. A WDM optical communication system can provide extremely high bandwidth, high capacity, long distance transmission.

In a long distance optical communication system, since a WDM optical signal attenuates while being transmitted through an optical transmission line, the WDM optical signal must be amplified after being transmitted a certain distance. For this reason, optical amplifying apparatuses for amplifying the WDM optical signal are currently in use, and further research and development of such apparatuses is occurring.

Therefore, in a conventional WDM optical communication system, an optical transmitting station uses wavelength division multiplexing to multiplex together a plurality of optical signals at different wavelengths into a WDM optical signal. The WDM optical signal is then transmitted through an optical transmission line. An optical receiving station receives the transmitted WDM optical signal from the optical transmission line. One or more optical repeater stations are positioned along the optical transmission line to amplify the WDM optical signal. The number of optical repeater stations is typically determined in accordance with system design parameters to provide a sufficient amount of amplification.

While being transmitted through the optical transmission line, the WDM optical signal deteriorates in its waveform due to wavelength dispersion, transmission loss, and a nonlinear optical effect Therefore, various countermeasures have been devised.

For example, various conventional methods have been devised for providing wavelength dispersion compensation. In one such method, a dispersion-managed fiber (hereinafter abbreviated to 'DMF') combines optical fibers with different wavelength dispersion from each other.

FIGS. 1A and 1B are diagrams showing the structures of conventional dispersion-managed fibers.

More specifically, FIG. 1A shows a partial structure between two stations in an optical communication system, where an optical repeater station 1004-A and an optical repeater station 1004-B are connected by an optical transmission line 1002. The optical transmission line 1002 is composed of an optical transmission line 1002-L1 whose wavelength-dispersion is positive and an optical transmission line 1002-L2 whose wavelength dispersion is negative. An optical signal is transmitted to the optical repeater station 1004-B from the optical repeater station 1004-A via the optical transmission line 1002-L1 and the optical transmission line 1002-L2. While being transmitted, the optical signal undergoes a positive wavelength dispersion in the optical transmission line 1002-L1 and undergoes a negative wavelength dispersion in the optical transmission line 1002-L2 to be compensated in a manner that accumulated wavelength dispersion becomes almost zero. The DMF as described above is disclosed, for example, in U.S. Pat. No. 5,191,631, and Japanese Patent Laid-open No. Hei 9-318824. A symmetrical DMF in which the wavelength dispersion is made symmetrical is also disclosed.

FIG. 1B shows a partial structure of two stations in an optical communication system. An optical repeater station 1004-C and an optical repeater station 1004-D are connected by the optical transmission line 1002. The optical transmission line 1002 is composed of an optical transmission line 1002-L3 whose wavelength dispersion is positive, an optical transmission line 1002-L4 whose wavelength dispersion is negative, and an optical transmission line 1002-L5 whose wavelength dispersion is positive. An optical signal which is sent out from the optical repeater station 1004-C undergoes the positive wavelength dispersion in the optical transmission line 1002-L3, undergoes the negative wavelength dispersion in the optical transmission line 1002-L4, and undergoes the positive wavelength dispersion in the optical transmission line 1002-L5. Therefore, the optical signal is transmitted to the optical repeater station 1004-D in a manner so that compensation causes accumulated wavelength dispersion to become almost zero. Meanwhile, an optical signal sent out from the optical repeater station 1004-D undergoes the positive wavelength dispersion in the optical transmission line 1002-L5, undergoes the negative wavelength dispersion in the optical transmission line 1002-L4, and undergoes the positive wavelength dispersion in the optical transmission line 1002-L3. Therefore, the optical signal is transmitted to the optical repeater station 1004-C in a manner so that compensation causes accumulated wavelength dispersion to become almost zero. Such a DMF is disclosed, for example, in U.S. Pat. No. 5,778,128, a paper, "Enhanced power solitons in optical fibers with periodic dispersion management" (N. J. Smith, F. M. Knox, N. J. Doran, K. J. Blow and I. Bennion: Electronics Letters, Vol. 31, No. 1, p54-p55, 4 Jan. 1996), a paper, "Energy-scaling characteristics of solitons in strongly dispersion-managed fibers" (N. J. Smith, N. J. Doran, F. M. Knox and W. Forysak Optics Letters, Vol. 21, No. 24, p1981- p1983, 15 Dec. 1966), and a paper, "40 Gbit/s×16 WDM transmission over 2000 km using dispersion managed low-nonlinear fiber span" (Itsuro Morita, Keiji Tanaka, Noboru Edagawa and Masatoshi Suzuki: ECOC 2000, Vol. 4, p25-p26, 2000).

These conventional technologies are devised from the viewpoint of wavelength dispersion compensation. Such technologies were not devised in consideration of a system in which an optical transmission line also serves as an optical amplifying medium for distributed optical amplification.

Meanwhile, various methods for compensating the transmission loss have also been conventionally devised, and a distributed optical amplifying apparatus, especially a distributed Raman amplifier, is one of them.

FIGS. 2A and 2B are diagrams showing the structures of conventional loss compensated/distributed Raman amplifiers.

FIG. 2A shows a partial structure between two stations in the optical communication system described above, where the optical repeater station 1004-A and an optical repeater station 1004-E are connected with the optical transmission line 1002. In the optical repeater station 1004-E, a pump light source 1005-E for supplying pump right used for Raman amplification is provided. The optical transmission line 1002 is composed of an optical transmission line 1002-L6 which has a large effective cross section and an optical transmission line 1002-L7 which has a small effective cross section compared with that of the optical transmission line 1002-L6, and it is supplied with the pump light from the pump light source 1005-E. An optical signal is transmitted from the optical repeater station 1004-A to the optical repeater station 1004-E via the optical transmission line 1002-L6 and the optical transmission line 1007-L7, and is Raman-amplified by the pump fight in the optical transmission line 1002 while being transmitted to be compensated in such a manner that transmission loss becomes almost zero. In other words, the optical signal is Raman-amplified so that an output optical level of the optical repeater station 1004-A and an input optical level of the optical repeater station 1004-E are substantially equal to each other. The effective cross section is a part of a cross section of the optical transmission line in which the optical signal and the pump-light interact with each other to cause sufficient Raman amplification. Such a DMF is disclosed, for example, in a paper, "40 Gbit/s×8 NZR WDM transmission experiment over 80 km×5-span using distributed Raman amplification in RDF" (R. Ohhira, Y. Yano, A. Noda, Y. Suzulki, C. Kurioka, M. Tachigori, S. Moribayashi, K. Fukuchi, T. Ono and T. Suzaki: ECOC '99, 26-30, p176-p177, September 1999, Nice, France).

Here, a size of the effective cross section correlates with a scale of the nonlinear optical effect When the effective cross section is large, the nonlinear optical effect is small. On the other hand, when the effective cross section is small, the nonlinear optical effect is large. Therefore, from the viewpoint of a choice of whether optical power in the optical repeater station 1004-A from which the optical signal is sent out is increased or optical power in the optical repeater station 1004E from which the pump light is supplied is increased, a structure as shown in FIG. 2B in also possible. In FIG. 2B, the optical transmission line 1002 is composed of an optical transmission line 1002-L8 which has a small effective cross section and an optical transmission line 1002-L9 which has a large effective cross section compared with the optical transmission line 1002-L8. The optical transmission line 1002-L8 is connected to the optical repeater station 1004-A Such a structure is disclosed, for example, in a paper, "A proposal of a transmission line without any loss in a longitudinal direction utilizing distributed Raman amplification" (Toshiaki Okuno, Tetsufumi Tsuzaki and Masayuki Nishimura: B-10-116, the 2000 Society Conference of the Institute of Electronics, Information and Communication Engineers).

These conventional technologies as shown in FIGS. 2A and 2B are technologies which are devised from the viewpoint of compensating the transmission loss and no consideration is made for the wavelength dispersion compensation, an optical signal-to-noise ratio (hereinafter abbreviated to 'optical SNR'), and so on.

Furthermore, in the conventional arts as shown in FIGS. 1A and 1B and FIGS. 2A and 2B, the nonlinear optical effect, especially a nonlinear phase shift, is not taken into consideration.

It is noteworthy that the wavelength dispersion and the effective cross section have such a correlation that an optical fiber with the positive wavelength dispersion usually has a small effective cross section and an optical fiber with the negative wavelength dispersion usually has a large effective cross section.

In realizing long distance transmission of an optical signal with less error ratio, there is a problem that the wavelength dispersion, the transmission loss, and the nonlinear optical effect need to be compensated in a well-balanced manner as a whole instead of compensating only one physical quantity.

SUMMARY OF THE INVENTION

It is an object of the present invention to provide an optical amplifying medium having appropriate characteristics for providing distributed optical amplification and which solves various of the above-described problems. It is also an object of the present invention to provide a distributed optical amplifying apparatus, an optical fiber cable, an optical communication station, and an optical communication system which use such an optical amplifying medium.

Additional objects and advantages of the invention will be set forth in part in the description which follows, and, in part, will be obvious from the description, or may be learned by practice of the invention.

Objects of the present invention are achieved by providing a distributed optical amplifying apparatus, including an optical fiber having a middle field with a characteristic value which is larger than characteristic values of fields other than the middle field, the characteristic value of a respective field being a nonlinear refractive index of the optical fiber at the respective field divided by an effective cross section of the fiber at the respective field. The apparatus also includes a pump light source supplying pump light to the optical fiber.

Objects of the present invention are also achieved by providing a distributed optical amplifying apparatus including a fiber line and a pump light source supplying pump light to the fiber line. The fiber line includes first, second and third optical fibers connected together so that light travels through the fiber line from the first optical fiber, then through the second optical fiber and then through the third optical fiber. The first, second and third optical fibers having first, second and third characteristic values, respectively. The second characteristic value is larger than the first characteristic value and the third characteristic value. The characteristic value of a respective optical fiber being a nonlinear refractive index of the optical fiber divided by an effective cross section of the optical fiber.

Objects of the present invention are further achieved by providing a distributed optical amplifying apparatus including (a) a fiber line comprising first, second and third optical fibers connected together so that light traveling through the fiber line travels through the first optical fiber, then through the second optical fiber, and then through the third optical fiber, and (b) a pump light source supplying pump light to the fiber line. A value D1/S1 of a wavelength dispersion coefficient D1 of the first optical fiber divided by a wavelength dispersion slope S1 thereof is almost equal to a value D2/S2 of a wavelength dispersion coefficient D2 of the second optical fiber divided by a wavelength dispersion slope S2 thereof. A sum of a value D1·L1 of the wavelength dispersion coefficient D1 of the first optical fiber multiplied by a length L1 thereof and a value of the wavelength dispersion coefficient D2 of the second optical fiber multiplied by a length L2 thereof is almost zero. A wavelength dispersion coefficient, a wavelength dispersion slope, and a length of the third optical fiber are almost equal to the wavelength dispersion coefficient D1, the wavelength dispersion slope S1, and the length L1 of the first optical fiber. Accumulated wavelength dispersion in a wavelength of an optical signal transmitted through the fiber line is almost zero at an output of the fiber line. An accumulated wavelength dispersion slope in the wavelength of the optical signal transmitted through the fiber line is almost zero at the output of the fiber line.

Objects of the present invention are also achieved by providing an optical communication station including a processing device for performing predetermined processing for an optical signal, and a fiber line connected to the processing device. The fiber line includes first, second and third optical fibers connected together so that the optical signal travels through the fiber line by traveling through the first optical fiber, then through the second optical fiber, and then through the third optical fiber. The first, second and third optical fibers have fist, second and third characteristic values, respectively. The second characteristic value is larger than the first and third characteristic values. The characteristic value of a respective optical fiber being a nonlinear refractive index of the optical fiber divided by an effective cross section of the optical fiber. A pump light source supplies pump light to the fiber line.

Objects of the present invention are further achieved by providing an optical communication system including (a) an optical transmission line, (b) first and second stations connected together through the optical transmission line and performing predetermined processing of an optical signal transmitted through the optical transmission line, and (c) a pump light source supplying pump light to the transmission line. The transmission line includes first, second and third optical fibers connected together so that the optical signal travels through the transmission line by traveling through the first optical fiber, then through the second optical fiber, and then through the third optical fiber. The first second and third optical fibers have first second and third characteristic values, respectively. The second characteristic value being larger than the first and third characteristic values. The characteristic value of a respective optical fiber is a nonlinear refractive index of the optical fiber divided by an effective cross section of the optical fiber.

Moreover, objects of the present invention are achieved by providing an optical communication system including (a) first and second transmission lines, each having first and second ends, (b) an optical transmitting station generating an optical signal and providing the generated optical signal to the first end of the first transmission line so that the optical signal travels through the first transmission line to the second end of the first transmission line, (c) an optical repeater station receiving the optical signal from the second end of the first transmission line, amplifying the received optical signal, and providing the amplifying optical signal to the first end of the second transmission line so that the amplified optical signal travels through the second transmission line to the second end of the second transmission line, and (d) an optical receiving station receiving the amplified optical signal from the second end of the second optical transmission line. At least one of the first and second transmission lines includes first, second and third optical fibers connected together so that the optical signal travels through the respective transmission line by traveling through the first optical fiber, then through the second optical fiber, and then through the third optical fiber. The first, second and third optical fibers having first, second and third characteristic values, respectively, the second characteristic value being larger than the first and third characteristic values. The characteristic value of a respective optical fiber being a nonlinear refractive index of the optical fiber divided by an effective cross section of the optical fiber. Pump fight source is providing to the respective transmission line.

Objects of the present invention are achieved by providing an optical fiber cable including a plurality of optical fibers. Each optical fiber has a characteristic value in a middle field which is larger than characteristic values in fields other than the middle field of the optical fiber, the characteristic value in a respective field being a nonlinear refractive index of the optical fiber in the field divided by an effective cross section of the optical fiber in the field.

Objects of the present invention are also achieved by providing an optical fiber cable including first, second and third optical fibers connected together so that light traveling through the cable travels through the first optical fiber, then through the second optical fiber and then through the third optical fiber. The second optical fiber has a negative dispersion value. The first and third optical fibers each have a positive dispersion value. The cable optically connects together two optical repeater stations, or an optical repeater station and an end station.

Moreover, objects of the present invention are achieved by providing an optical communication system including an optical fiber cable comprising first, second and third optical fibers connected together so that light traveling through the cable travels through the first optical fiber, then through the second optical fiber and then through the third optical fiber. The second optical fiber has a negative dispersion value. The first and third optical fibers each have a positive dispersion value. The cable optically connects together (a) two optical repeater stations with one of the optical repeater stations providing pump light to the cable so that distributed Raman amplification occurs in the cable, or (b) an optical repeater station and an end station so that one of the optical repeater station and the end station provides pump light to the cable so that distributed Raman amplification occurs in the cable.

In addition, objects of the present invention are achieved by providing an apparatus including a transmission line and a pump light source. The transmission line includes first, second and third optical fibers connected together from an input end to an output end of the transmission line so that a signal light travels through the input end, then through the first optical fiber, then through the second optical fiber, then through the third optical fiber and then through the output end. The first, second and third optical fibers have first, second and third characteristic values, respectively. The second characteristic value is larger than the first characteristic value and the third characteristic value. The characteristic value of a respective optical fiber being a nonlinear refractive index of the optical fiber divided by an effective cross section of the optical fiber. The pump light source supplies pump light to the transmission line so that the signal light is amplified by Raman amplification as the signal light travels through the transmission line Further, objects of the present invention are achieved by providing an apparatus including a transmission line and a pump light source. The transmission line includes first, second and third optical fibers connected together from an input end to an output end of the transmission line so that a signal light travels through the input end, then through the first optical fiber, then through the second optical fiber, then through the third optical fiber and then through the output end. The pump light source supplies pump light to the transmission line so that the signal light is amplified by Raman amplification as the signal light travels through the transmission line. A value D1/S1 of a wavelength dispersion coefficient D1 of the first optical fiber divided by a wavelength dispersion slope S1 thereof is almost equal to a value D2/S2 of a wavelength dispersion coefficient D2 of the second optical fiber divided by a wavelength dispersion slope S2 thereof. A sum of a value D1·L1 of the wavelength dispersion coefficient D1 of the first optical fiber multiplied by a length L1 thereof and a value of the wavelength dispersion coefficient D2 of the second optical fiber multiplied by a length L2 thereof is almost zero. A wavelength dispersion coefficient, a wavelength dispersion slope, and a length of the third optical fiber are almost equal to the wavelength dispersion coefficient D1, the wavelength dispersion slope S1, and the length L1 of the first optical fiber. Accumulated wavelength dispersion in a wavelength of the signal light is almost zero at the output end of the transmission line. An accumulated wavelength dispersion slope in the wavelength of the signal light is almost zero at the output end of the transmission line.

Moreover, objects of the present invention are achieved by providing an optical communication system including (a) an optical transmission line, (b) first and second stations connected together through the optical transmission line and performing predetermined processing of a signal light transmitted through the transmission line, and (c) a pump light source supplying pump light to the transmission line so that the signal light is amplified by Raman amplification as the signal light travels through the transmission line. The transmission line includes first, second and third optical fibers connected together so that the optical signal travels through the transmission line by traveling through the first optical fiber, then through the second optical fiber, and then through the third optical fiber. The first, second and third optical fibers have first, second and third characteristic values, respectively, the second characteristic value being larger than the first and third characteristic values. The characteristic value of a respective optical fiber being a nonlinear refractive index of the optical fiber divided by an effective cross section of the optical fiber.

Objects of the present invention are also achieved by providing an optical communication system including (a) first and second transmission lines, each having first and second ends, (b) an optical transmitting station generating an optical signal and providing the generated optical signal to the first end of the first transmission line so that the optical signal travels through the first transmission line to the second end of the first transmission line, (c) an optical repeater station receiving the optical signal from the second end of the first transmission line, amplifying the received optical signal, and providing the amplifying optical signal to the first end of the second transmission line so that the amplified optical signal travels through the second transmission line to the second end of the second transmission line, and (d) an optical receiving station receiving the amplified optical signal from the second end of the second optical transmission line. At least one of the first and second transmission lines includes first, second and third optical fibers connected together so that the optical signal travels through the respective transmission line by traveling through the first optical fiber, then through the second optical fiber, and then through the third optical fiber. The first, second and third optical fibers having first, second and third characteristic values, respectively, the second characteristic value being larger than the first and third characteristic values. The characteristic value of a respective optical fiber being a nonlinear refractive index of the optical fiber divided by an effective cross section of the optical fiber. Pump light being supplied to the respective transmission line so that the optical signal is amplified by Raman amplification as the optical signal travels through the respective transmission line.

Objects of the present invention are further achieved by providing an apparatus including a transmission line formed of first, second and third optical fibers, the first optical fiber being connected to the second optical fiber and the second optical fiber being connected to the third optical fiber so that a signal light traveling through the transmission line travels through the first optical fiber, then through the second optical fiber, then through the third optical fiber. The first, second and third optical fibers have first, second and third characteristic values, respectively, the second characteristic value being larger than the first characteristic value and the third characteristic value. The characteristic value of a respective optical fiber being a nonlinear refractive index of the optical fiber divided by an effective cross section of the optical fiber. The apparatus also includes a pump light source supplying pump light to the transmission line so that the signal right is amplified by Raman amplification as the signal light travels through at least one of the first, second and third optical fibers.

BRIEF DESCRIPTION OF THE DRAWINGS

These and other objects and advantages of the invention will become apparent and more readily appreciated from the following description of the preferred embodiments, taken in conjunction with the accompanying drawings of which:

FIGS. 22A and 22B are diagrams showing the structure of a bi-directional optical communication system, according to an embodiment of the present invention.

DESCRIPTION OF THE PREFERRED EMBODIMENTS

Figure 1A:
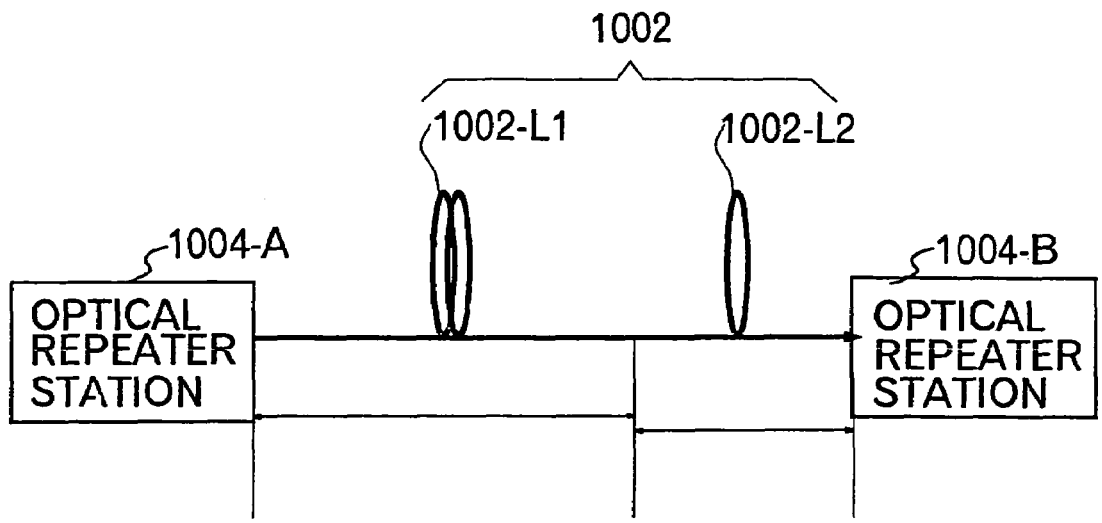
FIGS. 1A and 1B are diagrams showing the structures of conventional wavelength dispersion-managed optical transmission lines.
Figure 1B:
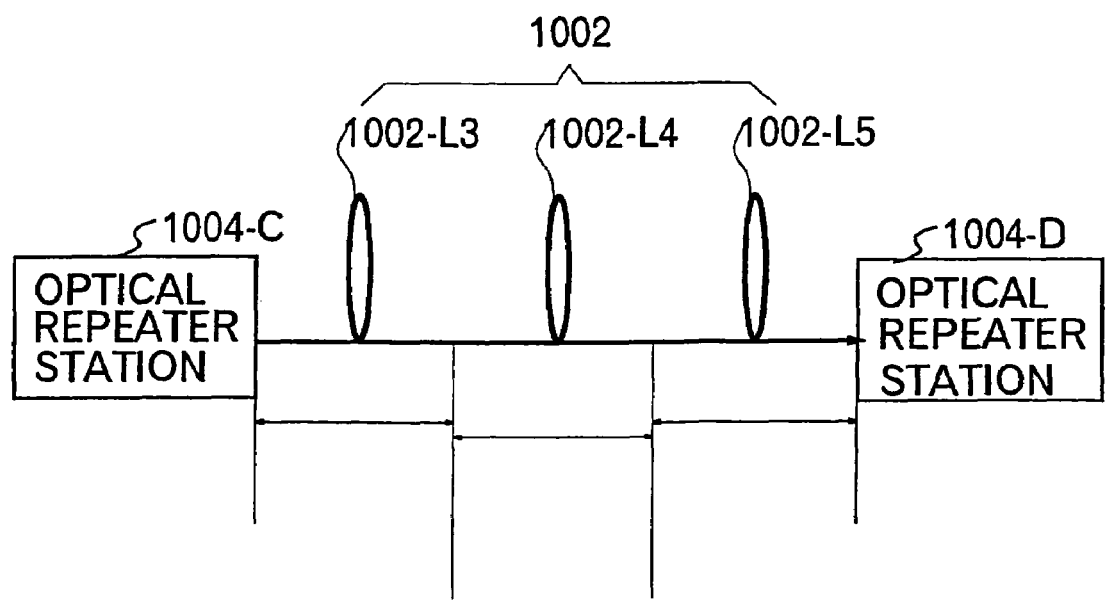

Reference wall now be made in detail to the present preferred embodiments of the present invention, examples of which are illustrated in the accompanying drawings, wherein like reference numerals refer to like elements throughout.

Figure 3:
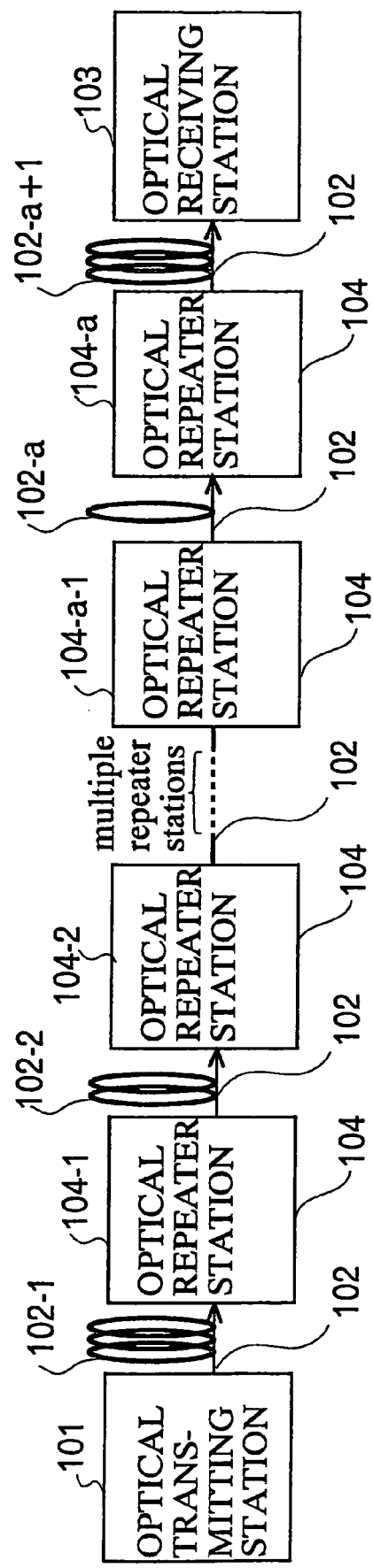
FIG. 3 is a diagram showing the structure of an optical communication system, according to an embodiment of the present invention.

FIG. 3 is a diagram showing the structure of an optical communication system, according to an embodiment of the present invention.

Figure 4A:
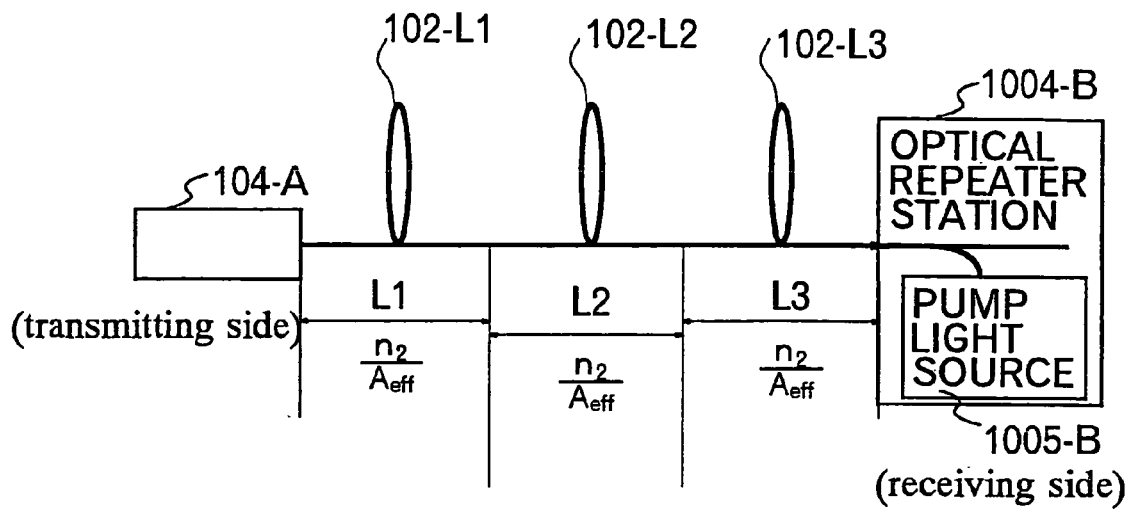
FIGS. 4A, 4B and 4C are a diagram showing the structure of a totally managed/distributed Raman amplifier and charts showing optical power and accumulated wavelength dispersion, according to an embodiment of the present invention.
Figure 4B:
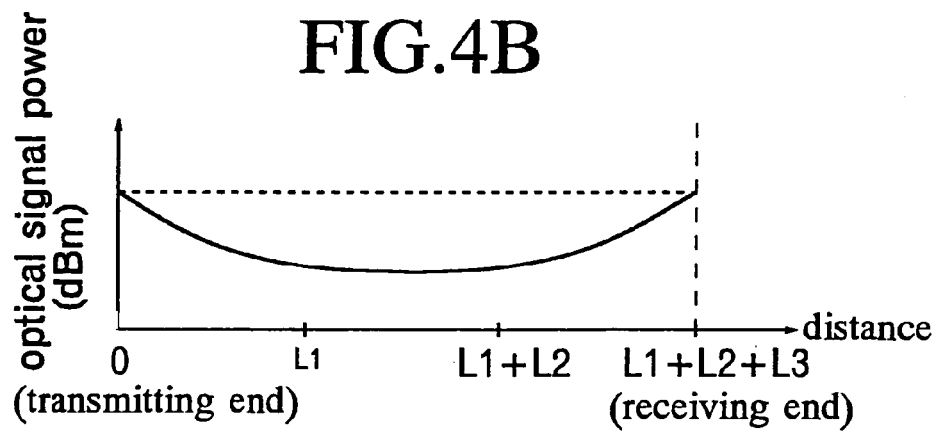
Figure 4C:
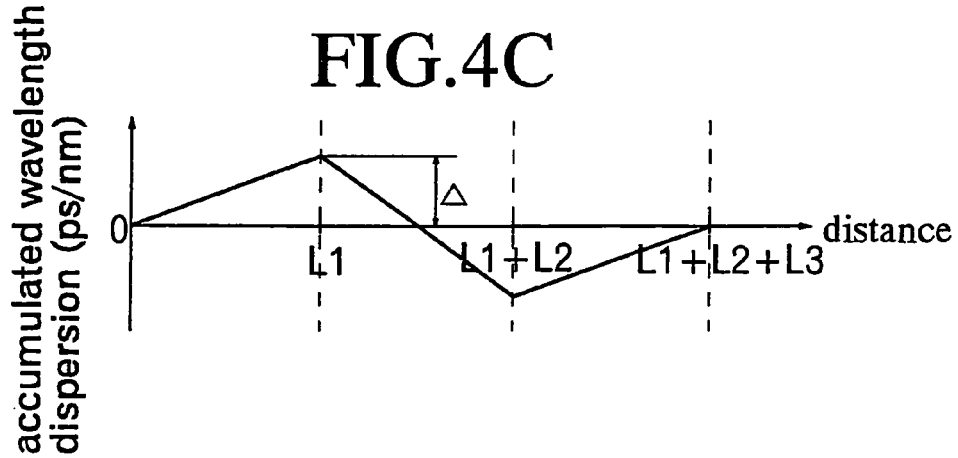

FIGS. 4A, 4B and 4C are diagrams showing the structure of a totally managed/distributed Raman amplifier and charts showing optical signal power and accumulated wavelength dispersion, and showing a partial structure between two stations in the optical communication system.

Referring now to FIG. 3 and FIGS. 4A, 4B and 4C. the optical communication system includes an optical transmitting station 101 generating a WDM optical signal including a plurality (for example, "m") optical signals at different wavelengths multiplexed together. The generated WDM optical signal is transmitted through an optical transmission line 102 to an optical receiving station 103. The optical receiving station 103 receives the WDM optical signal and then processes the received WDM optical signal. The optical transmission line 102 receives pump light supplied by a pump fight source (not shown in FIG. 3, but see pump light source 105B in FIG. 4A) so that the optical transmission line 102 serves as an optical amplifying medium The optical transmission line 102 is shown in FIG. 3 is being formed of individual optical transmission lines 102-1 through 102-a+1, and is shown in FIG. 4A as being formed of individual optical transmission lines 102-L1, 102-L2 and 102-L3.

Optical repeater stations 104 (shown individually as optical repeaters 104-1 through 104a in FIG. 3, and 104-A and 104-B in FIG. 4A) are connected between each of the optical transmission lines 102 in the optical communication system. Plural optical repeater stations 104 are disposed between each of the individual optical transmission lines forming optical transmission line 102 according to need. Each optical repeater station 104 includes a pump light source (such as the pump right source 105B shown for optical repeater station 104-B in FIG. 4A) for supplying the pump light used for distributed optical amplification to the optical transmission line 102. Furthermore, each optical repeater station 104 would typically have a concentrated optical amplifying part and/or an optical add/drop part according to need. The concentrated optical amplifying part is, for example, an optical circuit for amplifying the WDM optical signal to a predetermined output optical level. The optical add/drop part is, for example, an optical circuit for adding/dropping an optical signal corresponding to a predetermined channel to/from the WDM optical signal. Moreover, a pump light source (such as pump light source 105-B in FIG. 4A) is also disposed in the optical receiving station 103.

The optical transmission line 102 is an optical fiber in which, for each section between repeaters, or between a repeater and an end station, has a characteristic value in its middle field that is larger than characteristic values in fields other than the middle field, where the characteristic value is a nonlinear refractive index $n_2$ divided by an effective cross section $A_{e\!f\!f}$. More specifically, as shown in FIG. 4A, the optical transmission line 102 is comprised of a first optical transmission line 102-L1 which has a predetermined characteristic value, a second optical transmission line 102-L2 which is connected to the first optical transmission line 102-L1 and has a characteristic value larger than that of the first optical transmission line 102-L1, a third optical transmission line 102-L3 which is connected to the second optical transmission line 102-L2 and has a characteristic value smaller than that of the second optical transmission line 102-L2. The first optical transmission line 102-L1 is connected to an optical repeater station 104-A (sometimes, for example, to the optical transmitting station 101 in FIG. 3) disposed on an upstream side of the transmission direction of the WDM optical signal. The third optical transmission line 102-L3 is connected to an optical repeater station 104-B (sometimes, for example, to an optical receiving station 103 in FIG. 3) disposed on a downstream side of the transmission direction of the WDM optical signal.

In the optical communication system as described above, an optical signal is Raman-amplified in the optical transmission line 102 by the pump light which is supplied from a pump light source so that transmission loss of the optical transmission line 102 can be compensated. Such pump light might be provided, for example, from a pump right source inside of an optical repeater station 104 (such as pump right source 105-B in FIG. 4A) and/or by a pump light source in an optical receiving station 103.

A Raman amplification characteristic can be calculated by the following formula 1.

$$\frac{dP_f(z, v)}{dz} = -a(v)P_f(z, v) + \gamma(v)P_b(z, v) +$$

$$\int_{\xi > v} \left\{ \frac{gr}{A_{eff}}(v - \xi)[P_f(z, \xi) + P_b(z, \xi)]P_r(z, v) + \right.$$

$$\left. 2hv\frac{gr}{A_{eff}}(v - \xi)[P_r(z, \xi) + P_b(z, \xi)] \times \left(1 + \frac{1}{e^{h(\xi-v)/kT} - 1}\right) \right\} d\xi -$$

$$\int_{\xi < v} \left\{ \frac{gr}{A_{eff}}(v - \xi)[P_f(z, \xi) + P_b(z, \xi)]P_f(z, v) + \right.$$

$$\left. 2hv\frac{gr}{A_{eff}}(v - \xi)[P_f(z, \xi) + P_b(z, \xi)] \times \left(1 + \frac{1}{e^{h(\xi-v)/kT} - 1}\right) \right\} d\xi$$

Here, when a z axis is taken parallel to the transmission direction in the optical transmission line 102, $P_f(z, v)$ is power of forward light (all light propagating forward along the optical transmission line) at a distance z and a frequency $v$, $P_b(z, v)$ is power of backward light (all light propagating backward along the optical transmission line) at the distance z and the frequency $v$, $\alpha(v)$ is attenuation amount at the frequency $v$, $\gamma(v)$ is a Reyleigh's scattering coefficient at the frequency $v$, gr ($\Delta v$) gr ($\xi-v$) is a Raman's gain coefficient between a frequency $\xi$ and $v$, $A_{eff}$ is the effective cross section of the optical transmission line 102, h is a Planck's constant, k is a Boltzmann's coefficient, and T is temperature of the optical transmission line 102.

For formula 1, a paper, "Pump interactions in a 100 nm Bandwidth Raman amplifier" (H. Kidorf, K. Rottwitt, M. Nissov, M. Ma, and E. Rabarijaona: IEEE Photonics Technology Letters, Vol. 11, No. 5, p530-p532) is referred to.

By setting optical power of the pump light property according to the formula 1, an input level on a receiving side and an output level on a transmitting side can be made substantially equal to each other, as shown in FIG. 4B, in the section between the optical transmitting station 101 and the optical repeater station 104-1, between each of the optical repeater stations 104 (for example, between optical repeater stations 104-1 and 104-2, and between optical repeater stations 104-*a*-1 and 104-*a*), and between the optical repeater station 104-*a* and the optical receiving station 103.

Alternately, the input level on the receiving side and the output level on the transmitting side can be made substantially equal not according to formula 1, but by detecting the output level at a transmitting end, notifying the receiving side of this value, and controlling the power of the pump light while detecting the input level at a receiving end.

Note that a horizontal axis indicates distance and a vertical axis indicates optical signal power in FIG. 4B.

A nonlinear phase shift $\phi$NL is given by the following formula 2.

$$\Phi_{NL} = k \int_O^L \frac{n_2(z)}{A_{eff}(z)} P(z)dz \qquad \text{(Formula 2)}$$

Here, $n_2(z)$ is a nonlinear refractive index regarding a direction of a z-axis, $A_{eff}(z)$ is an effective cross section regarding the z-axis, P (z) is optical power regarding the z-axis, k is expressed as k=1/$\lambda$, and $\lambda$ is a signal wavelength.

By formula 2, the nonlinear phase shift can be prevented by making the characteristic value small in a field with large optical power, for example, in a field near the transmitting end where the optical signal is sent out and a field near the receiving end where the pump light is supplied. Furthermore, in a field with small power, for example, in a field near a middle of the optical transmitting line 102 in the transmission direction, even when the characteristic value is increased, the nonlinear phase shift does not increase very much.

Therefore, the optical transmission line 102 as described above, where the characteristic value of the middle optical transmission line 102-L2 is made larger than the characteristic values of the optical transmission lines 102-L1 and 102-L3 on both sides, can prevent the nonlinear phase shift.

Moreover, from the viewpoint of wavelength dispersion of the optical transmission line 102, the correlation between the accumulated wavelength dispersion (ps/nm) and the distance (km) is such as shown in FIG. 4(C) when, for example, the first optical transmission line 102-L1 and the third optical transmission line 102-L3 have positive wavelength dispersion (+D), and the second transmission line 102-L2 has negative wavelength dispersion (−D). More specifically, accumulated wavelength dispersion of the optical communication system is depicted as a wavelength dispersion diagram where the wavelength dispersion increases between 0 and L1 as the distance increases, the wavelength dispersion decreases between L1 and L1+L2 as the distance increases, and the wavelength dispersion increases again between L1+L2 and L1+L2+L3 as the distance increases. Therefore, the optical transmission line 102 can also compensate the wavelength dispersion.

In addition, compared with a two-division structure of a DMF, deviation amount of the accumulated wavelength dispersion in the optical transmission line can be reduced and the accumulated wavelength dispersion averaged over the distance can be made small so that waveform deterioration due to a nonlinear optical effect can be reduced.

Incidentally, as for the wavelength dispersion of the optical transmission line 102, it is also suitable that the fist optical transmission line 102-L1 and the third optical transmission line 102-L3 have the negative wavelength dispersion (−D) and the second optical transmission line 102-L2 has the positive wavelength dispersion (+D).

Here, supposing that a wavelength dispersion coefficient, a wavelength dispersion slope, and a length of the first optical transmission line 102-L1 are D1, S1, and L1 respectively, and a wavelength dispersion coefficient, a wavelength dispersion slope, and a length of the second optical transmission line 102-L2 are D2, S2, and L2 respectively, and a wavelength dispersion coefficient, a wavelength dispersion slope, and a length of the third optical transmission line 102-L3 are D3, S3, and L3 respectively, when the optical transmission line is structured to satisfy the correlation in the following formula, the wavelength dispersion slope is compensated at the same time, so that uniform transmission characteristics can be realized in respective signal wavelengths.

$$D1/S1=D2/S2=D3/S3, D1\cdot L1+D2\cdot L2+D3\cdot L3=0 \qquad \text{(Forumla 3)}$$

Note that a horizontal axis indicates the distance and a vertical axis indicates the accumulated wavelength dispersion in FIG. 4C.

Thus, the optical communication system as shown in FIG. 3 and FIGS. 4A, 4B and 4C can compensate the transmission loss and the wavelength dispersion and prevent the nonlinear phase shift to greatly improve an optical SNR, as compared with a conventional optical communication system. This makes it possible to lengthen the transmission distance compared with that in a conventional optical communication system.

Simulations to certify the above-described effects are explained next.

Figures 5A, 5B, 5C, 5D:
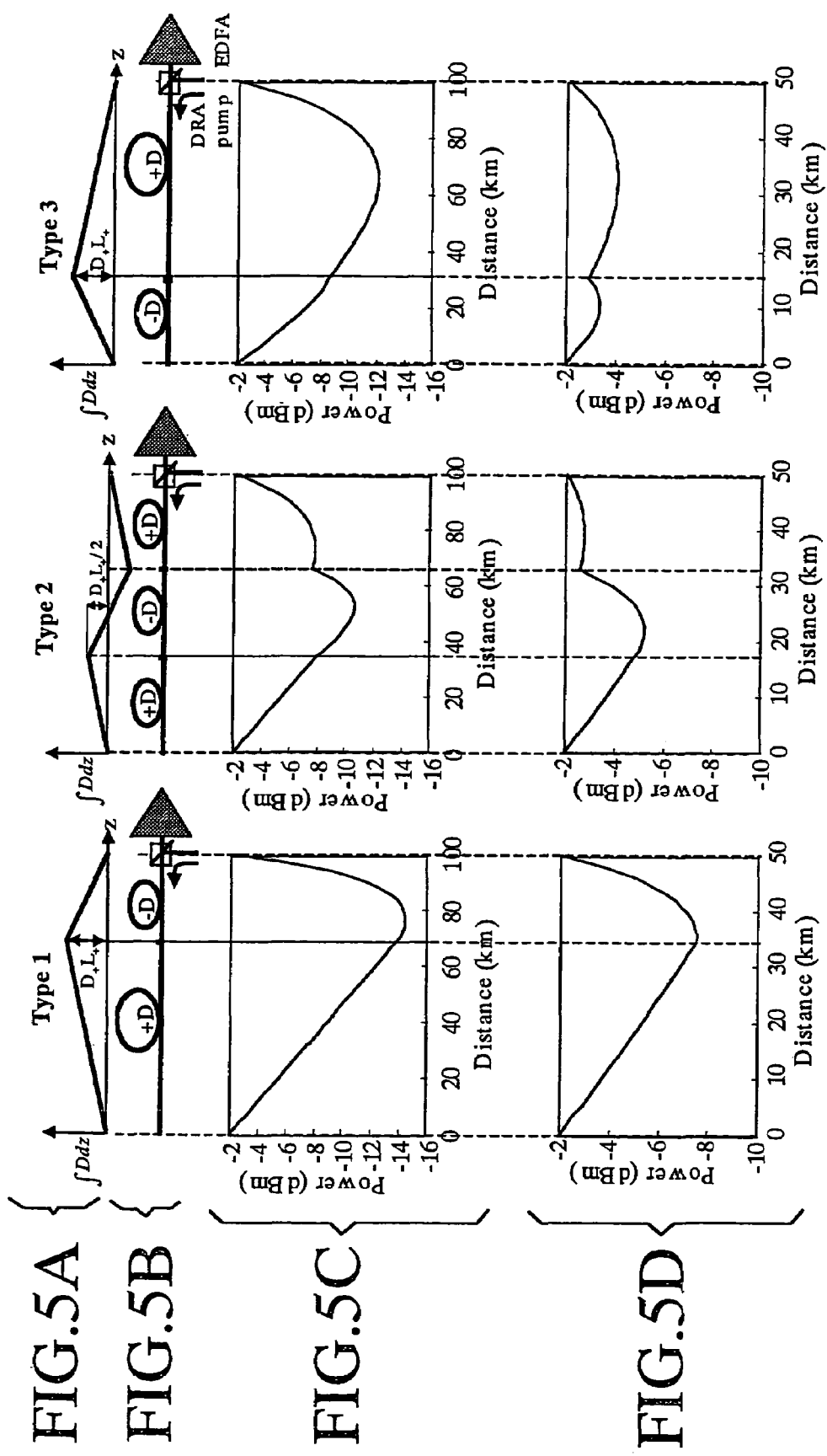
FIGS. 5A, 5B, 5C and 5D are charts showing the correlation between optical power and transmission distance for each structure of an optical transmission line, according to an embodiment of the present invention.

FIGS. 5A, 5B, 5C and, 5D are charts showing the correlation between the optical power and the transmission distance for each structure of the optical transmission line.

The simulations are carried out in an optical communication system having a DMF, which serves as an optical amplifying medium and an optical transmission line, and an optical repeater station which is connected to the DMF, with the structure of the DMF being changed. Pump light is supplied to the DMF via backward pumping, and an erbium-doped optical fiber amplifier with a noise FIG. 6 dB is provided in the optical repeater station.

The simulations were carried out for three typical structures of the DMF. A DMF in a first case (Type 1) is composed of a first optical fiber with +D and a second optical fiber with −D and it is a case where the pump light is supplied to the second optical fiber. A DMF in a second case (Type 2) is composed of a first optical fiber whose characteristic value $n_2/A_{eff}$ is small compared with that of a second optical fiber and which has positive wavelength dispersion, the second optical fiber which has negative wavelength dispersion, and a third optical fiber whose characteristic value $n_2/A_{eff}$ is small compared with that of the second optical fiber, and it is a case where the pump light is supplied to the third optical fiber. Incidentally, in this simulation, the first optical fiber and the third optical fiber use a fiber with the same characteristic and their lengths are equal to each other. A DMF in a third case (Type 3) is composed of a second optical fiber with −D and a first optical fiber with +D, and it is a case where the pump light is supplied to the first optical fiber with +D.

The second case (Type 2) is the optical transmission system according to the present invention.

The characteristic parameters of the fist to the third optical fibers are shown in Table 1. These characteristic parameters are examples using values which can be realized easily from the viewpoint of manufacturing and other values may of course be used. The characteristic parameters in Table 1 are values at 1550 nm.

value among channels) in the optical transmission line when Raman-amplification is performed so that input signal power in the optical transmission line and output signal power in the optical transmission line become equal to each other. FIG. 5C shows a case when the transmission distance is 100 km and FIG. 5D shows a case when the transmission distance is 50 km.

The results are shown in FIG. 6 to FIG. 11.

Figure 6:
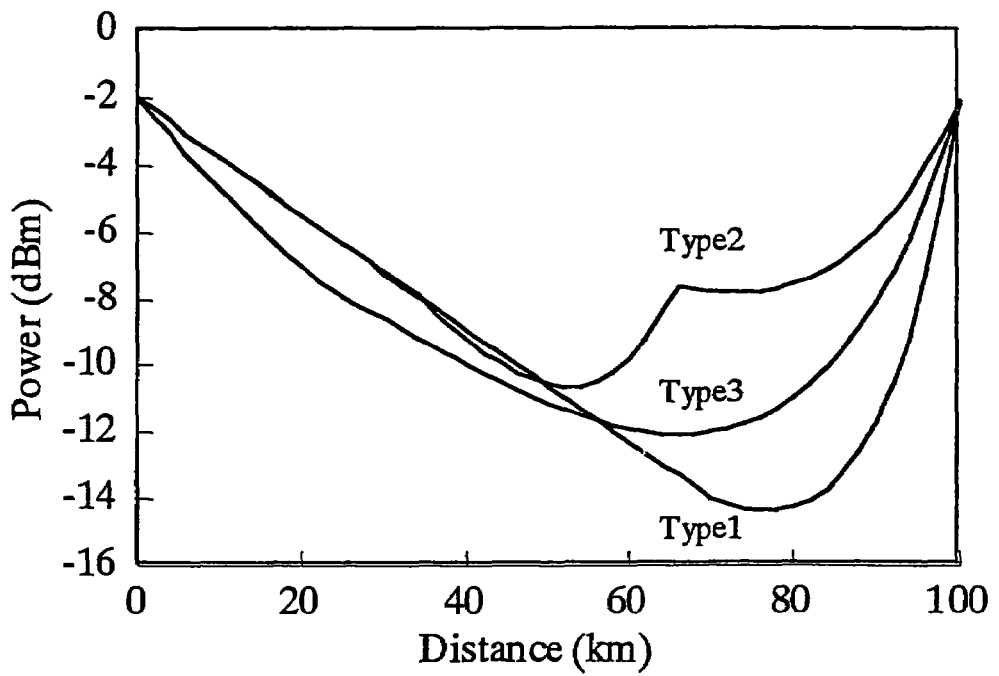
FIG. 6 is a chart showing a state of signal optical power (an average value among channels) in the optical transmission line when Raman-amplification is performed so that input signal power of the optical transmission line and output signal power of the optical transmission line become equal to each other, according to an embodiment of the present invention.

FIG. 6 is a chart showing a state of the signal optical power (the average value among the channels) in the optical transmission line when the Raman-amplification is performed so that input signal power in the optical transmission line and the output signal power in the optical transmission line become equal to each other.

Figure 7:
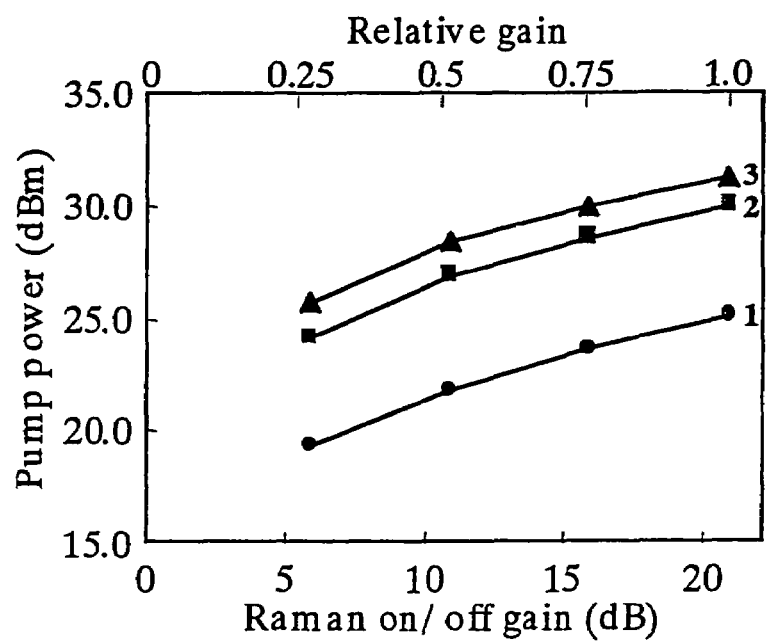
FIG. 7 is a chart showing the correlation between pump right power and a Raman on/off gain, according to an embodiment of the present invention.

FIG. 7 is a chart showing the correlation between the pump light power and a Raman on/off gain.

Figure 8:
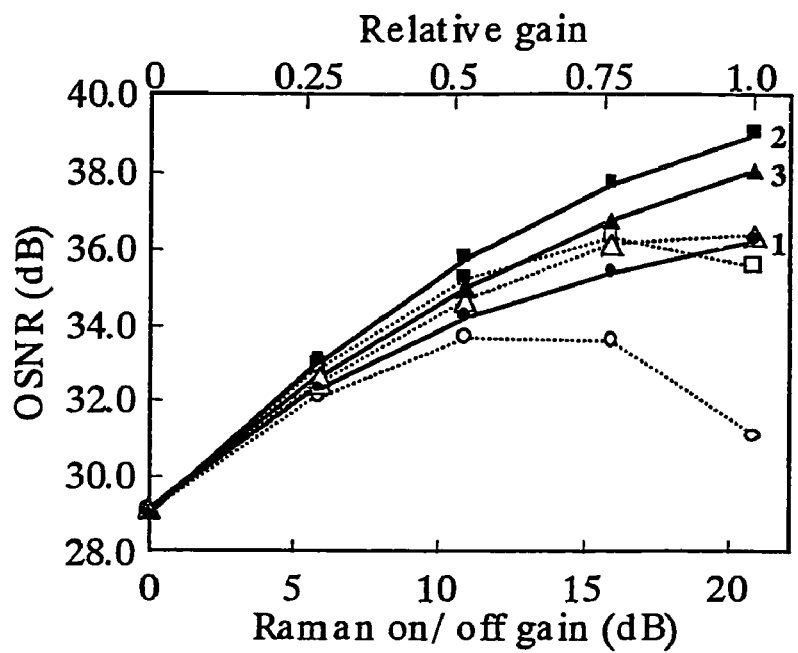
FIG. 8 is a chart showing the correlation between an optical SNR and the Raman on/off gain, according to an embodiment of the present invention.

FIG. 8 is a chart showing the correlation between an optical SNR and the Raman on/off gain.

Figure 9:
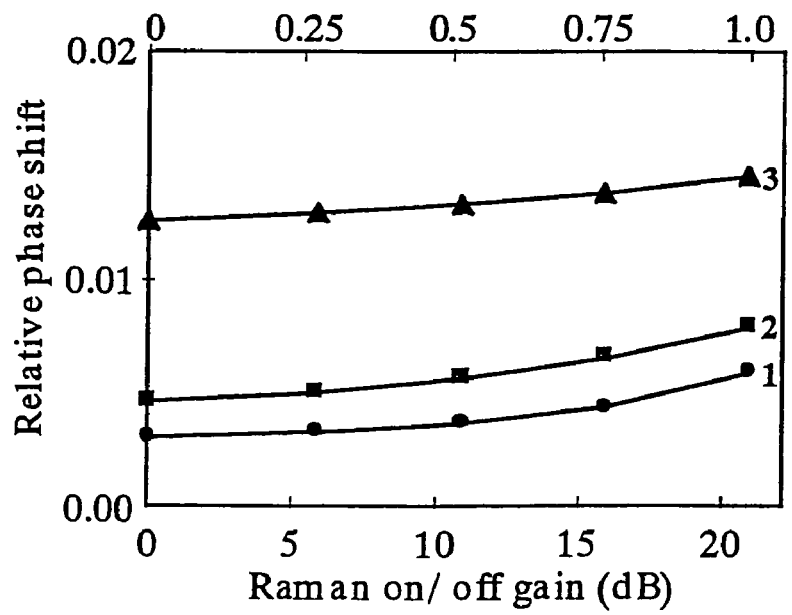
FIG. 9 is a chart showing the correlation between phase shift and the Raman on/off gain, according to an embodiment of the present invention.

FIG. 9 is a chart showing the correlation between a phase shift and the Raman on/off gain.

Figure 10A:
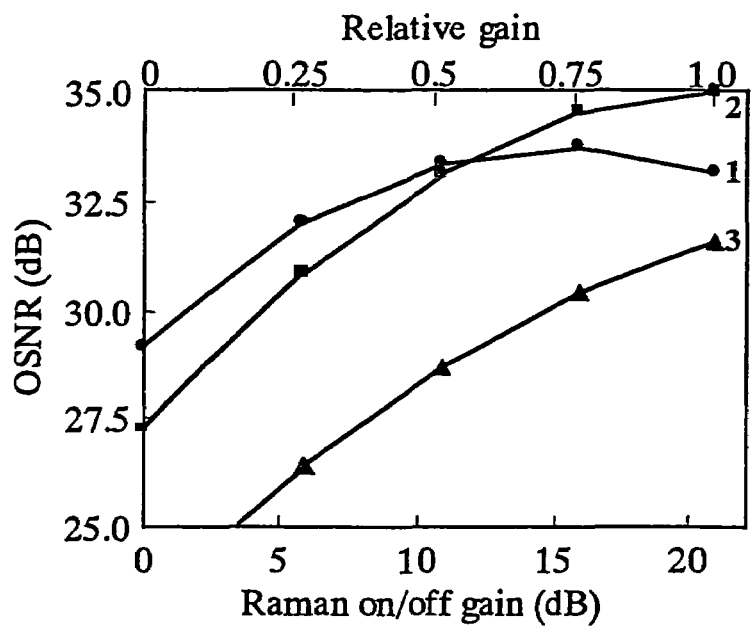
FIGS. 10A and 10B are charts showing the correlation between the optical SNR and the Raman on/off gain, according to an embodiment of the present invention.
Figure 10B:
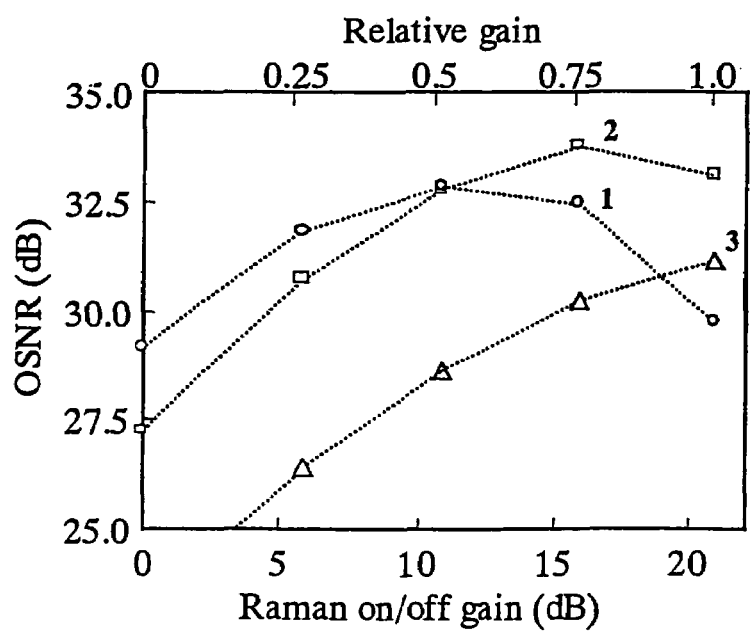

FIGS. 10A and 10B are charts showing the correlation between the optical SNR and the Raman on/off gain.

Figure 11:
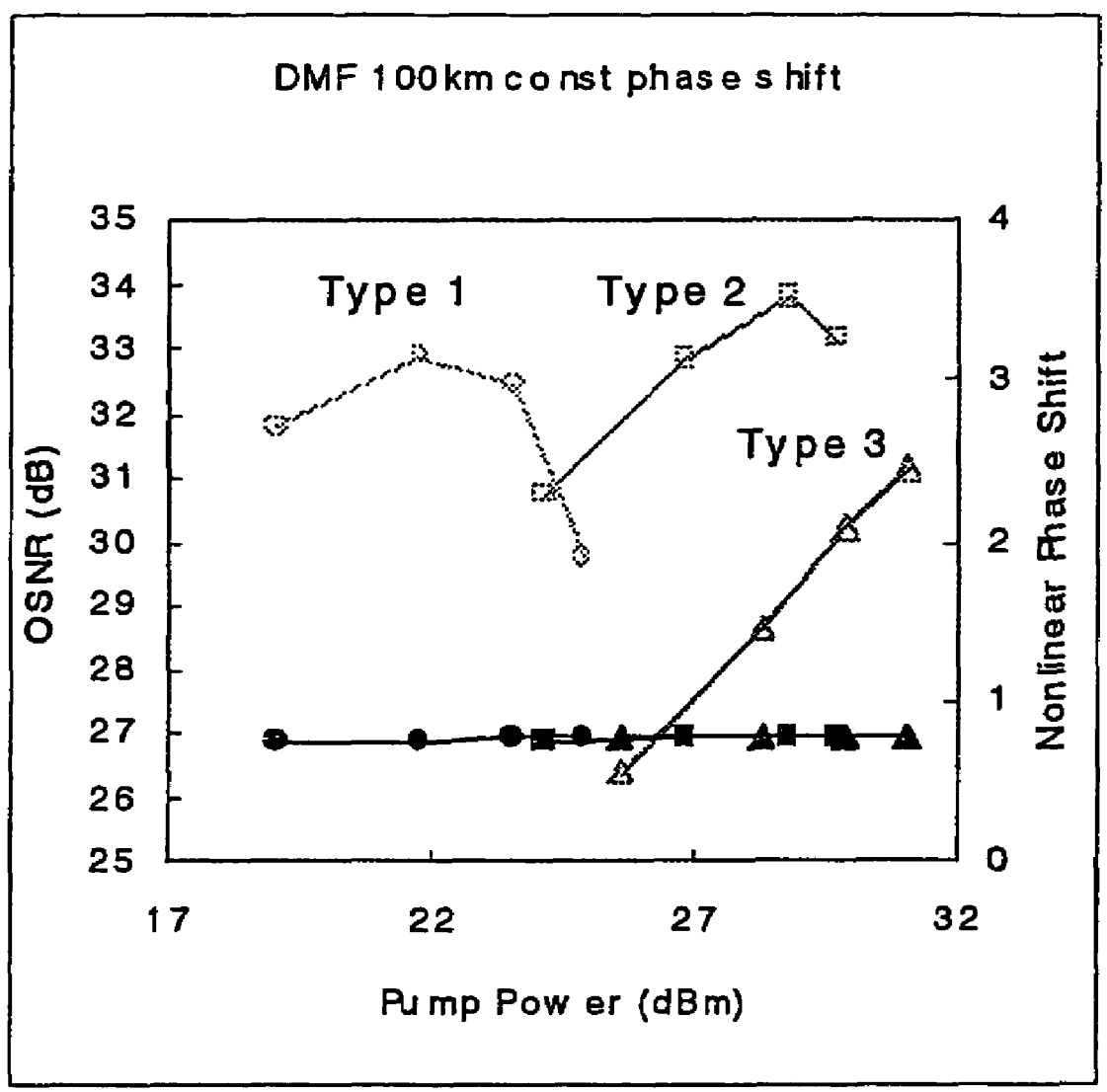
FIG. 11 is a chart showing the correlation between the optical SNR and pump light power and the correlation between the phase shift and the Raman on/off gain, according to an embodiment of the present invention.

FIG. 11 is a chart showing the correlation between the optical SNR and the pump right power and the correlation between the phase shift and the Raman on/off gain.

Here, FIG. 7 to FIGS. 10A and 10B are the results when the transmission distance is 100 km.

Note that in FIG. 6, a horizontal axis indicates the distance shown in a unit of km and a vertical axis indicates the optical power in the optical transmission One 102 shown in a unit of dBm. In FIG. 7, a lower horizontal axis indicates the Raman on/off gain shown in the unit of dB and a vertical axis indicates the pump light power shown in the unit of dBm. In FIG. 8, a lower horizontal axis indicates the Raman on/off gain

TABLE 1

Characteristic parameters of first optical fiber and second optical fiber (L1 + L3:L2 = 2:1)

| Optical Fiber | Length L (km) | Wavelength Dispersion D (ps/nm/km) | Loss α (dB) | Effective Cross section Aeff (μm²) | Raman's gain coefficient gr (m/W) | Nonlinear Refractive index $n_2$ (W$^{-1}$) | Reyleigh's Scattering Coefficient γ (m$^{-1}$) |
|---|---|---|---|---|---|---|---|
| first | L1 + L3 = 68.7 | +20 | 0.174 | 110 | $0.56 \times 10^{-13}$ | $2.9 \times 10^{-20}$ | $5.8 \times 10^{-8}$ |
| second | L2 = 31.3 | −43.9 | 0.274 | 20 | $0.56 \times 10^{-13}$ | $4.0 \times 10^{-20}$ | $25 \times 10^{-8}$ |
|  | 100.0 |  |  |  |  |  |  |

As shown, for example, in FIG. 3, the total length of the DMF is, for example, 100 km in all the cases (Type 1, Type 2, and Type 3). According to the characteristic parameters in Table 1, the total loss of the optical fibers of 100 km is 20.5 dB. In each of the first to the third cases (Type 1, Type 2, and Type 3), the lengths of the first optical fiber and the second optical fiber, as shown in FIG. 5A, are adjusted in a manner that accumulated wavelength dispersion becomes zero at 1550 nm after a WDM optical signal is transmitted through the DMF (that is, after transmitted for 100 km). In the WDM optical signal, wavelengths of 44 waves are multiplexed at an interval of 100 GHz at 1529 nm to 1569 nm of a C band. An excitation wavelength of the pump light is set at a wavelength at which the WDM optical signal is Raman-amplified based on the (formula 1) and optical power of the pump light is set in a manner that a deviation of optical power between channels at an output end of the DMF is within ±0.2 dB.

Note that a horizontal axis indicates distance and a vertical axis indicates the accumulated wavelength dispersion in FIG. 5A FIG. 5C shows a state of signal optical power (an average shown in the unit of dB and a vertical axis indicates the optical SNR shown in the unit of dB. In FIG. 9, a lower horizontal axis indicates the Raman on/off gain shown in the unit of dB and a vertical axis indicates the phase shift. In FIGS. 10A and 10B, each lower horizontal axis indicates the Raman on/off gain shown in the unit of dB and each vertical axis indicates the optical SNR shown in the unit of dB. In FIG. 7 to FIGS. 10A and 10B, each upper horizontal axis indicates a relative gain. Here, the relative gain is defined as a value of the Raman on/off gain (dB) divided by total transmission loss (dB), and in this simulation, the total transmission loss is 20.5 dB. In FIG. 11, a horizontal axis indicates the pump light power shown in a unit of dBm and a vertical axis indicates the optical SNR shown in a unit of dB. In each of the drawings, the results for the first case (Type 1) are indicated with ● or ○, the results for the second case (Type 2) are indicated with ■ or □, and the results for the third case are indicated with ▲ or △. The optical SNR is calculated by the following formula 4.

$$\text{Optical } SNR = (\text{Optical } SNR_{DRA}^{-1} + \text{Optical } SNR_{EDPA}^{-1})^{-1} \quad \text{(Formula 4)}$$

Here, an optical $SNR_{DRA}$ is an optical SNR by the Raman amplification and an optical $SNR_{EDFA}$ is an optical SNR by the erbium-doped optical fiber amplifier.

The Raman on/off gain is a ratio between an input level at a receiving end when the pump light is supplied (on) and an input level at the receiving end when the pump light is not supplied (off).

FIG. 6 is a chart in which each of the charts in FIG. 5C is summarized in one chart. As is clear from FIG. 6, an extent of decrease in an optical level in the transmission distance is the lowest in the second case (Type 2) when transmission is performed. In a 0 km to approximately 50 km distance, a characteristic of each of the cases is substantially the same with each other and in an approximately 50 km to 100 km distance, the characteristic of each of the cases is different from each other to a great extent. Therefore, it is clear that the Raman amplification is performed remarkably in a distance up to approximately 50 km from a receiving end to which the pump right is supplied.

As is clear from FIG. 7, the pump light power required for obtaining the same Raman on/off gain increases in the order of the first case (Type 1), the second case (Type 2), and the third case (Type 3). In other words, the Raman on/off gain can be obtained with the smallest pump right power in the first case, which is the most efficient. This is because a -D fiber whose nonlinear effective cross section is small and a Raman gain coefficient is large is allotted in a field closest to a pump right incident end (that is, a field where the pump light power is sufficiently large). Note that a case where the Raman on/off gain is 20.5 dB in FIG. 7 is shown in FIG. 6. More specifically, in order to make an input level at the receiving end almost equal to an output level at a transmitting end, the pump light power supplied in each of the cases is different from each other.

Meanwhile, when the Raman on/off gain is the same, the optical SNR deteriorates in the order of the second case (Type 2), the third case (Type 3), and the first case (Type 1) as is clear from FIG. 8.

In a transmission system utilizing optical amplification, the optical SNR is an essential factor in determining signal quality. In FIG. 8, solid lines indicate the optical SNRs defined by a ratio Ps/Pn of signal light power Ps to noise light power Pn (a definition of the optical SNR which is generally used). Here, the noise light power Pn is a sum Pn=Pr+Pe of spontaneous Raman scattered right power Pr accompanying the Raman amplification and amplified spontaneous emission (ASE) power Pe by the erbium-doped optical fiber amplifier (EDFA). Furthermore, in the transmission system utilizing the Raman amplification, cross talk due to double Reighleigh's scattering deteriorates signal quality. Therefore, in this study, an effect caused by the double Reighleigh's scattering is also studied. Broken lines in FIG. 8 indicate the optical SNRs when the double Reighlegh's scattering is taken into consideration. In this calculation, the double Reighlegh's scattered light is also taken as the noise light besides the spontaneous Raman scattered light and the ASE More specifically, the noise light power Pn is defined by a sum Pn=Pr+Pe+Pd of the spontaneous Raman scattered light power Pr, the ASE power Pe, and double Reighleigh's scattered light power Pd, and the optical SNR is defined by the ratio Ps/Pn of the signal optical power Ps to the noise optical power Pn.

When the Raman on/off gain is the same the nonlinear phase shift worsens in the order of the first case (Type 1), the second case (Type 2), and the third case (Type 3) as is dear from FIG. 9.

Therefore, in compensating the transmission loss, the second case (Type 2) is the most preferable when considering a balance among efficiency of the Raman on/off gain, improvement of the optical SNR and prevention of the nonlinear phase shift.

FIGS. 10A and 10B and FIG. 11 are charts in which this is seen more clearly.

FIGS. 10A and 10B are results when input power of the optical fiber is adjusted so that the nonlinear phase shift becomes a reference value under each condition. The reference value is a value of the nonlinear phase shift which occurs in the first case (Type 1) under the condition that an input level is -2 dBm and the pump light is not supplied.

Referring to calculation results (solid lines in FIG. 10A) when an influence of a Reyleigh's cross talk is taken into consideration, it is dear that the highest (the most preferable) optical SNR is obtained in the case of Type 2. It is also clear that the optical SNR in the case of Type 2 is higher than that in the other cases (Type 1 and 3) in a range where the relative gain is approximately 0.5 or more (the Raman on/off gain is approximately 10 dB or more).

Furthermore, referring to calculation results (dotted lines in FIG. 10B) where the Reyleigh's cross-talk is taken into consideration, it is dear that the highest optical SNR obtained in the case of Type 2 is high compared with the highest optical SNRs in the other cases (Type 1 and Type 3). Therefore, the result that the most preferable optical SNR can be obtained in the case of Type 2 is also true to the case when the Reyleigh's cross-talk is taken into consideration. It is also clear that the optical SNR in the case of Type 2 is high compared with those in the other cases (Type 1 and 3) in a range where the relative gain is approximately 0.5 to 1 (the Raman on/off gain is approximately 10 to 20.5 dB).

FIG. 11 is a chart where the horizontal axis in FIGS. 10A and 10B is replaced by that indicating the pump light power instead and the nonlinear phase shift is also plotted. Solid lines in FIG. 11 indicate the nonlinear phase shifts and broken lines indicate the optical SNRs.

At present, an upper limit value of the pump light power is limited at around +27 to +30 dBm from a safety point of view and by a maximum output of the pump light source. However, in Type 2, it is clear that a preferable optical SNR can be obtained without exceeding the upper limit value of the pump light power.

Thus, when considering a balance among compensation of the transmission loss, the efficiency of the Raman on/off gain, and the prevention of the nonlinear phase shift, the second case (Type 2) is the most preferable. Furthermore, since the deviation amount of the accumulated wavelength dispersion in the optical transmission line can be reduced in the second case (Type 2), as shown in FIG. 4C and FIG. 5A, it is the best from the viewpoint of dispersion compensation. In order to confirm this, the following transmission waveform simulation is carried out.

Figure 12:
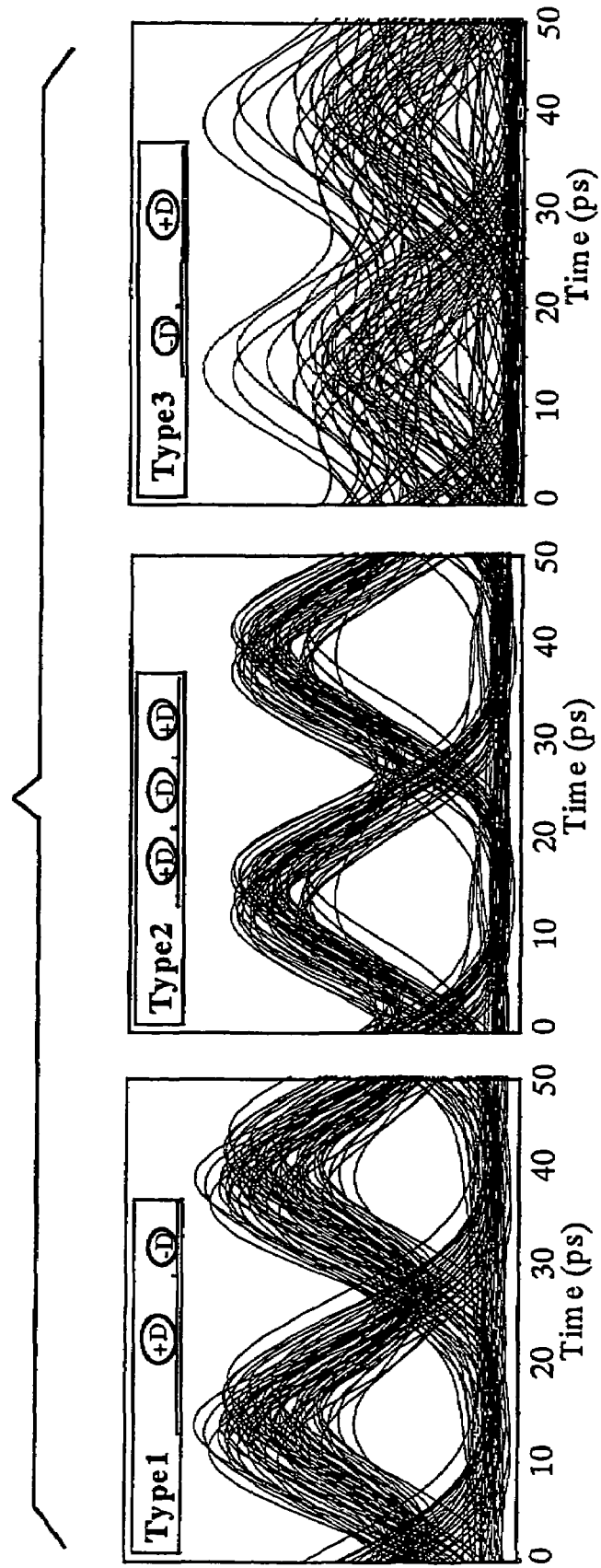
FIG. 12 is a chart showing an eye pattern of the optical transmission line for each structure, according to an embodiment of the present invention.

FIG. 12 is a chart showing an eye pattern for each structure of the optical transmission line.

FIG. 12 is a chart showing the eye pattern after a return zero (RZ) optical signal of 40 Gbit/S with each signal being disposed at an interval of 100 GHz is input into the optical transmission line of each of the first to the third case (Type 1, Type 2, and Type 3) at an input level of +4 dBm/ch. and transmitted for 600 km (100 km×6 span).

As is dear from FIG. 12, the second case (Type 2) according to the present invention can obtain the most preferable wavelength with the widest eye pattern aperture.

Therefore, the optical transmission line in the second case (Type 2) compensates the wavelength dispersion, the transmission loss, and the nonlinear optical effect in a well-balanced manner as a whole and also improves the optical SNR most.

Incidentally, in the above description, explanation is given about the case where a ratio L2/(L1+L3) of the length of the second optical fiber (L2) to the total length of the first optical fiber (L1+L3) is approximately 0.5, but other ratios are permissible. The length ratio is studied below.

According to reference papers, catalog investigation, and logical studies, values of the characteristic parameters to be taken by optical fibers which can be manufactured with the present technology are shown in Table 2. Here, the characteristic parameters in Table 2 are values at a wavelength of 1550 nm.

TABLE 2

Characteristic parameters of feasible optical fiber

| Optical Fiber | Effective Cross Section Aeff ($\mu m^2$) | Nonlinear Refractive Index $n_2$ ($W^{-1}$) | $n_2$/Aeff (1/m$^{-1}$) | Wavelength Dispersion D (ps/nm/km) | Slope of Wavelength Dispersion (ps/nm$^2$/km) |
|---|---|---|---|---|---|
| first | 55~120 | $2 \times 10^{-20}$~$3 \times 10^{-20}$ | $1.7 \times 10^{-10}$~$5.5 \times 10^{-10}$ | D1 = +8~+21 | 0.05~0.07 |
| second | 15~45 | $2 \times 10^{-20}$~$4 \times 10^{-20}$ | $4.4 \times 10^{-10}$~$26.7 \times 10^{-10}$ | D2 = −14~−60 | −0.03~−0.3 |

In order to make the accumulated wavelength dispersion zero in one section (between two stations), the ratio L2/(L1+L3) of the second optical fiber length L2 to the total length (L1+L3) of first optical fiber is required to be made as follows:

$$L2/(L1+L3) = -D1/D2$$

It is clear that the following formula holds good in the characteristic parameters of the optical fiber shown in Table 2.

$$L2/(L1+L3) = -D1/D2 = 0.17 \sim 1.5$$

Furthermore, according to the results as shown in FIG. 5C and so on, in order to obtain the Raman amplification characteristic for compensating the transmission loss with smaller pump light power, it is more advantageous to lengthen the length L2 of the second optical fiber, but on the other hand, in order to prevent the nonlinear phase shift, it is more advantageous to shorten the length L2 of the second optical fiber. Therefore, from the viewpoint of this balance, it is preferable that the ratio L2/(L1+L3) of the second optical fiber length L2 to the total length (L1+L3) of the first optical fiber is approximately 0.5 to 1.

In order to study this in detail, the following simulation is carried out It is described above that the present invention is effective when the length ratio is approximately 0.5, and therefore, a case where the length ratio is increased to 1 is explained below. The characteristic parameters of the optical fiber in this case are shown in Table 3.

between the optical SNR and the Raman on/off gain and shows results when the input power of the optical fiber is adjusted so that the nonlinear phase shift becomes a reference value. The reference value is a value of the nonlinear phase shift which occurs in the Type 1 structure under the condition where the input level of the optical fiber is −2 dBm/ch. and the pump light is not supplied. Referring to the calculation result (solid lines in FIGS. 13A and 13B) when the influence of the Reyleigh's cross talk is not taken into consideration, it is clear that the highest (the most preferable) optical SNR can be obtained in the case of Type 2. Moreover, the optical SNR in the case of Type 2 is high compared with those in the other cases (Type 1 and 3) in the range where the relative gain is approximately 0.5 or more (the Raman on/off gain is approximately 10 dB or more).

Furthermore, referring to the-calculation result when the Reyleigh's cross talk is taken into consideration (dotted lines in FIGS. 13A and 13B), it is dear that a maximum optical SNR obtained in the case of Type 2 is high compared with maximum optical SNRs in the other cases (Type 1 and 3). Therefore, the result that the most preferable optical SNR can be obtained in the case of Type 2 is also true when the Reyleigh's cross talk is taken into consideration. In addition, the optical SNR in the case of Type 2 is high compared with those in the other cases (Type 1 and 3) in the range where the relative gain is approximately 0.5~1 (the Raman on/off gain is approximately 10~20.5 dB).

The results described above certify that the present invention is also effective when the length ratio of the optical fiber L2/(L1+L3) is approximately 1 instead of 0.5. Therefore it can be said that the present invention is especially effective when the length ratio L2/(L1+L3) is 0.5~1.

Next, a length of the transmission line for which the present invention is effective is studied. In order to obtain the Raman

TABLE 3

Characteristic parameters of first optical fiber and second optical fiber (L1 + L3:L2 = 1:1)

| Optical Fiber | Length L (km) | Wavelength Dispersion D (ps/nm/km) | Loss α (dB) | Effective Cross Section Aeff ($\mu m^2$) | Raman's Gain Coefficient gr (m/W) | Nonlinear Refractive Index $n_2$ ($W^{-1}$) | Reyleigh's Scattering Coefficient γ ($m^{-1}$) |
|---|---|---|---|---|---|---|---|
| first | L1 + L3 = 50 | +14 | 0.178 | 110 | $0.56 \times 10^{-13}$ | $2.7 \times 10^{-20}$ | $5.8 \times 10^{-8}$ |
| second | L2 = 50 | −14 | 0.230 | 40 | $0.56 \times 10^{-13}$ | $3.3 \times 10^{-20}$ | $15 \times 10^{-8}$ |
| | 100.0 | | | | | | |

The results of the simulation are shown in the drawings.

Figure 13A:
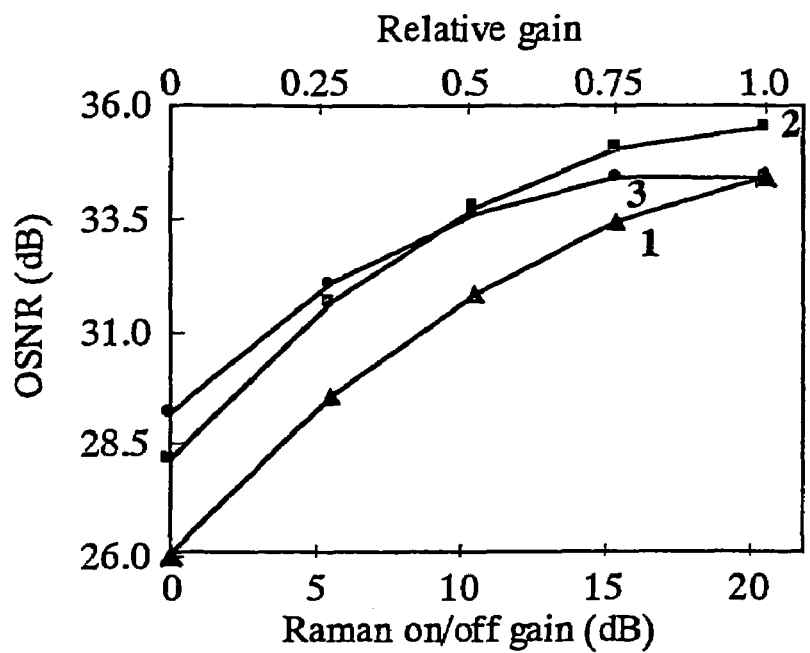
FIGS. 13A and 13B are charts showing the correlation between the optical SNR and the Raman on/off gain, according to an embodiment of the present invention.
Figure 13B:
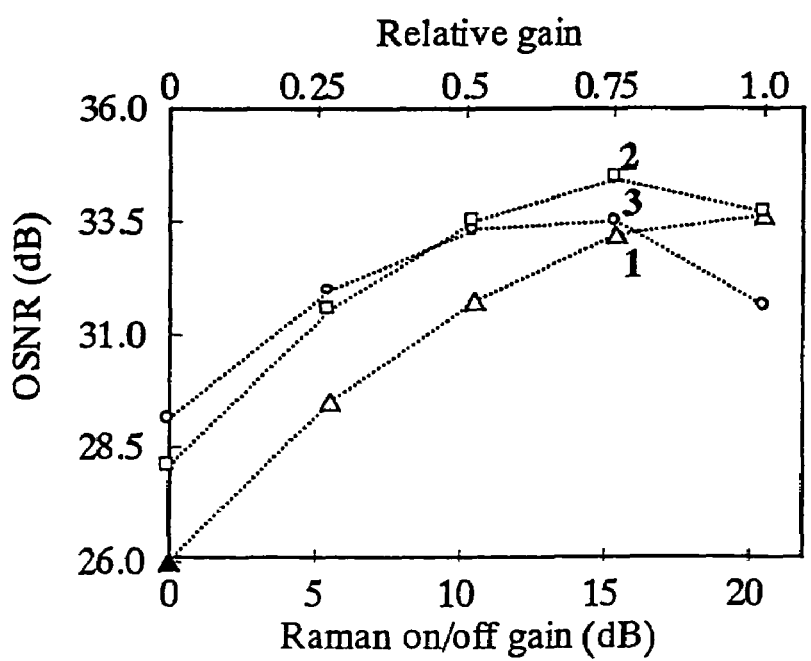

The results of the simulation are shown in FIGS. 13A and 13B. FIGS. 13A and 13B are charts showing the correlation amplification characteristic which compensates the transmission loss with less pump light, it is more advantageous to shorten the total length of the transmission line (L1+L2+L3), but when the length of the transmission line is shortened, signal optical power in the second optical fiber with a large nonlinear coefficient increases so that the effects of the present invention tend to lower. In order to confirm this, simulations are carried out with the length of the transmission line being shortened up to 50 km.

Figure 14A:
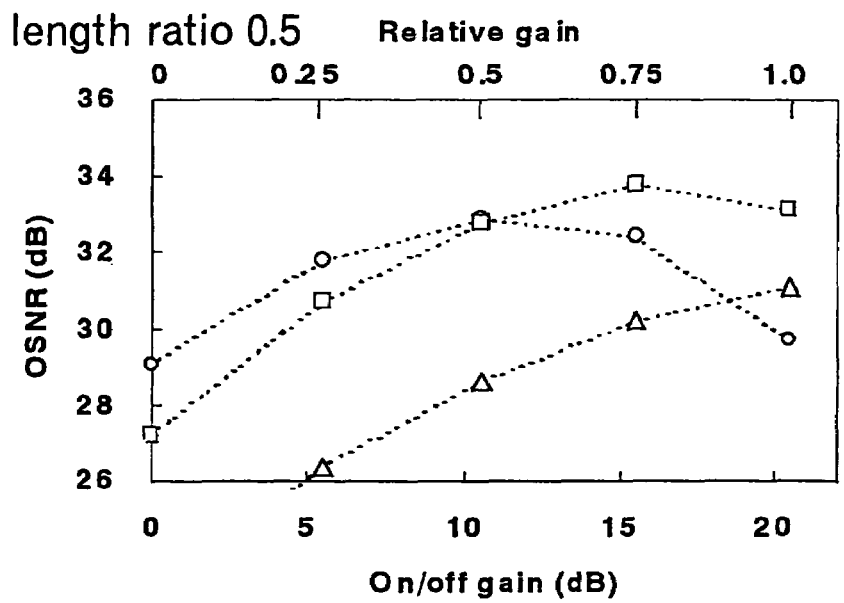
FIGS. 14A and 14B are charts showing the correlation between the optical SNR and the Raman on/off gain (a length ratio: approximately 0.5, transmission line length: 100 km, 50 km, respectively), according to an embodiment of the present invention.
Figure 14B:
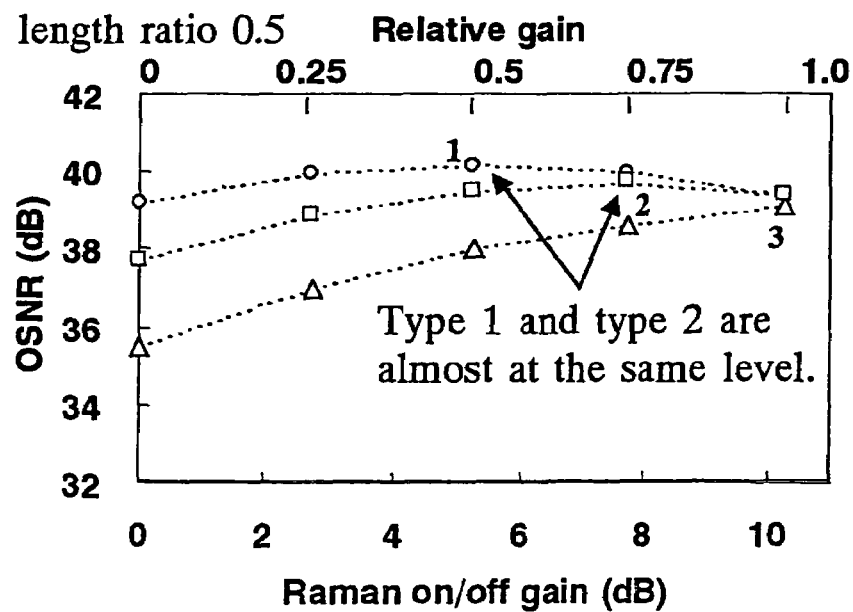
Figure 15A:
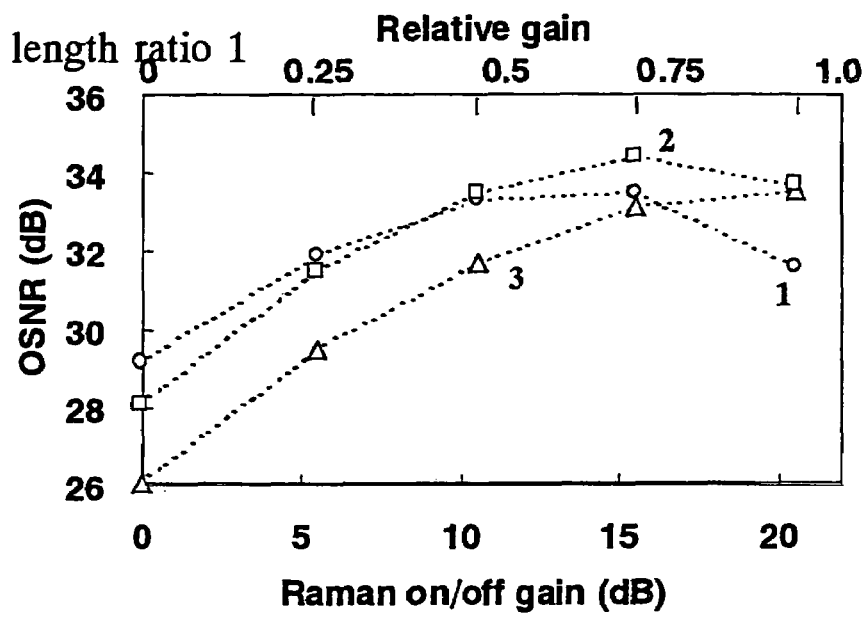
FIGS. 15A and 15B are charts showing the correlation between the optical SNR and the Raman on/off gain (a length ratio: approximately 1, a transmission line length: 100 km, 50 km respectively), according to an embodiment of the present invention.
Figure 15B:
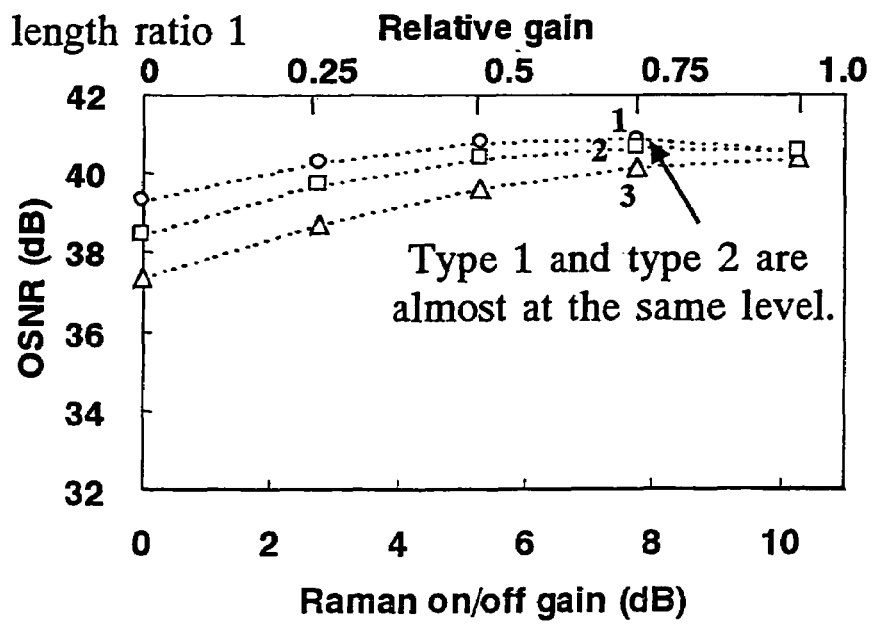

FIGS. 14A and 14B show the optical SNR when the length ratio L2/(L1+L3) is approximately 0.5 and the length of the transmission line is 100 km and 50 km, respectively. FIGS. 15A and 15B show the optical SNR when the length ratio L2/(L1+L3) is approximately 1 and the length of the transmission line is 100 km and 50 km, respectively. FIGS. 14A and 14B and FIGS. 15A and 15B are both results when the influence of the double Reyleigh's scattering is taken into consideration. As is clear from the drawings, the optical SNRs in the cases of Type 2 and Type 1 show preferable characteristics compared with that of Type 3, but since the maximum optical SNRs of Type 1and Type 2 are almost at the same level, it can be seen that the superiority of Type 2 (or the present invention) over the other types is lowered compared with that in the case of the 100 km length of the transmission line. Therefore, it is dear that the present invention is especially effective when the length of the transmission line is 50 km or more instead of shortening it excessively. However, when it is 50 km or less, the superiority of the present invention from the viewpoint of the dispersion compensation cable manufacturing efficiency is not lost.

Figure 16:
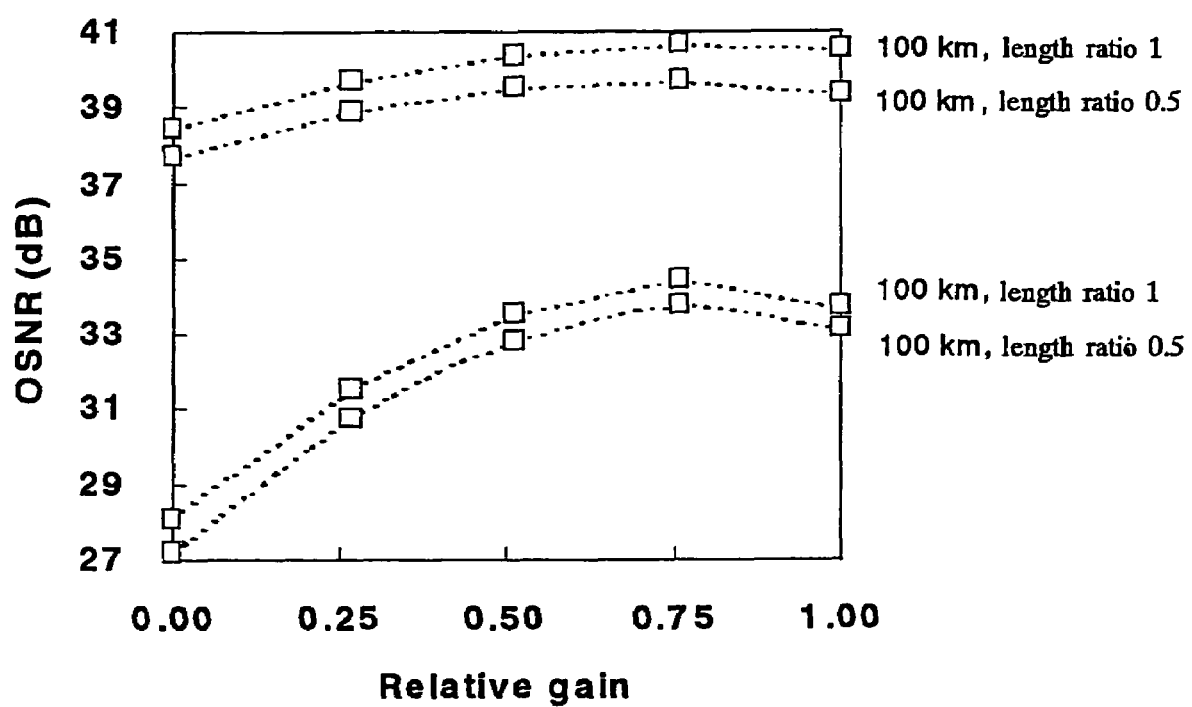
FIG. 16 is a chart showing the correlation between a relative gain and the optical SNR (Type 2), according to an embodiment of the present invention.

FIG. 16 is a chart in which the results described above are summarized with regard to the correlation between the relative gain and the optical SNR in the case of Type 2. All of the curves show the results when the double Reyleigh's scattering is taken into consideration and the nonlinear phase shift is fixed. According to FIG. 16, it is clear that in all of the cases, the preferable optical SNR can be obtained in the range in which the relative gain is 0.5 to 1.

Next, example structures of the optical transmitting station 101, the optical repeater station 104, and the optical receiving station 103 are described in detail.

First, the structure of the optical transmitting station 101 is explained.

Figure 17:
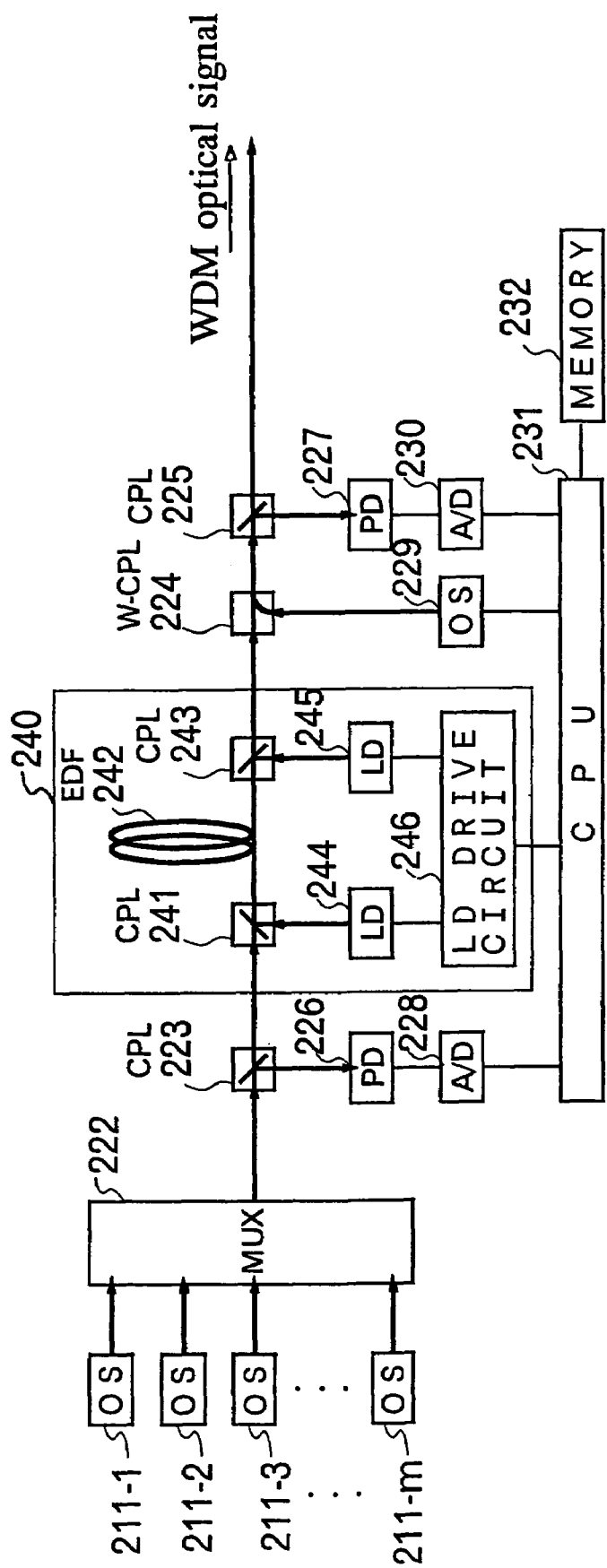
FIG. 17 is a diagram showing the structure of an optical transmitting station in the optical communication system, according to an embodiment of the present invention.

FIG. 17 is a diagram showing the structure of the optical transmitting station in the optical communication system. In FIG. 17, optical senders (hereinafter abbreviated to 'OS') 211-1 through 211-m each generates an optical signal which is input to an optical multiplexer (hereinafter abbreviated to 'MUX') 222. The number of optical senders would typically correspond to the number of wavelengths to be multiplexed together into a WDM optical signal. For example, m optical senders OS 211-1 through OS 211-m would be provided to generate m optical signals, respectively, at different wavelengths. These m optical signals are then multiplexed by MUX 222 into a WDM optical signal.

Each OS 211-1 through 211-m might comprise, for example, a semiconductor laser for oscillating laser light at a predetermined wavelength, an external modulator such as, for example, a Mach-Zehnder interferometer type optical modulator for modulating the laser light by information to be transmitted to thereby generate a resulting optical signal, and a semiconductor optical amplifier for amplifying the optical signal. An oscillation wavelength of the semiconductor laser is set according to each channel of the WDM optical signal. For example, a WDM optical signal in a C band is arranged between 1530 nm~1570 nm. Incidentally, there are other bands such as an S+ band (1450 nm~1490 nm), an S band (1490 nm~1530 nm), an L band (11570 nm~1610 nm), and an L+ band (1610 nm~1650 nm). Of course, an optical sender is not limited to this specific embodiment, and many different types and configurations of optical senders are readily available.

The MUX 222 multiplexes the wavelengths of respective optical signals output from OSs 221-1~221-m, to thereby output a WDM optical signal.

The WDM optical signal output from the MUX 22 is input to an optical coupler (hereinafter abbreviated to 'CPL') 223 to be divided, for example, into two signals. One of the divided signals is input to an optical amplifying part 240 while the other is input to a photodiode (hereinafter abbreviated to 'PD') 226.

The CPL 223 is an optical component for dividing incident light into two signals to thereby output the two signals. For example, a microoptic optical coupler such as a half mirror, an optical fiber type optical coupler of a fused fiber, an optical waveguide type optical coupler, etc., are examples of possible devices which can be sued as CPL 223. However, the present invention is not limited to these examples.

A PD 226 is a photoelectric converter for generating current according to optical power of received light. An output of the PD 226 is input to an analog-digital converter (hereinafter abbreviated to 'A/D') 228 for converting an analog input to a digital output An output of the A/D 228 is input to a central processing unit (hereinafter abbreviated to 'CPU') 231 such as a microprocessor for computing and processing. An input level of the WDM optical signal which is input to the optical amplifying part 240 is detected by the PD 226.

The optical amplifying part 240 is a concentrated optical amplifying circuit and comprises, for example, CPLs 241 and 243, an erbium-doped optical fiber (hereinafter abbreviated to 'EDF') 242, laser diodes (hereinafter abbreviated to 'LD') 244 and 245, and an LD drive circuit 246. An erbium element is one of rare earth elements, whose element symbol is Er and atomic number is 68. Elements which belong to lanthanoids have similar properties to each other.

The WDM optical signal input to the optical amplifying part 240 is input to the CPL 241. To the CPL 241, laser light output from the LD 244 is also input as pump light for the EDF 242 Various semiconductor lasers, for example, a Fabry-perot-resonating type laser, a distributed feedback laser, a distributed brag reflector laser, etc., can be utilized for the LD. However, the present invention is not limited to these examples.

The CPL 241 multiplexes the WDM optical signal input to the optical amplifying part 240 and the laser right output from the LD 244 and thereafter, inputs it to the EDF 242. To another end of the EDF 242, laser light output from the LD 245 is also input via the CPL 243.

The EDF 242 absorbs the laser light output from the LD 244 and the LD 245 to excite an erbium ion in the EDF 242 and form an inverted population. When the WDM optical signal is input to the EDF 242 where the inverted population is formed, the EDF 242, in which stimulated emission is induced by the WDM optical signal, amplifies the WDM optical signal. Thus, the EDF 242 is excited bi-directionally. Since the LDs 244 and 245 are pump light sources for the EDF 242, oscillation wavelengths thereof are set at an excitation wavelength of the EDF 242, for example, 1480 nm, 980 nm, and so on.

An optical fiber amplifier doped with an erbium element is used as an amplifier in the optical amplifying part 240 in this embodiment, but a rare earth element may be chosen according to an amplifying band of the optical amplifying part 240. As rare earth elements for amplifying other bands, for, example, neodymium (Nd), praseodymium (Pr), thulium (Tm), and so on are known. Thus, the present invention is not limited to the use of any specific rare earth element.

The LD drive circuit 246 outputs control signals to the LD 244 and the LD 245 respectively. The LD drive circuit 246 adjusts, for example, element temperature of the LDs 244 and 245 to stabilize the oscillation wavelengths of the laser light. Furthermore, the LD drive circuit 246 adjusts, for example, drive current of the LDs 244 and 245 based on a control signal of the CPU 231 to control optical power of the laser fight, whereby a gain of the optical amplifying part 240 is controlled. There are many different ways to appropriately drive a laser diode, and the present invention is not limited to the specific way described here.

The optical amplifying part 240 in FIG. 17 has a structure in which the WDM optical signal is amplified by one stage of the erbium-doped optical fiber amplifier, but the optical amplifying part 240 is not limited to this structure. For example, the optical amplifying part 240 may have a two-stage structure, including, for example, a first optical amplifier for amplifying right, an optical attenuating part for attenuating the light output from the first optical amplifier, and a second optical amplifier for amplifying the light output from the optical attenuator. In the optical amplifying part 240 thus structured, a gain as a function of wavelength, especially a gain slope of the optical amplifying part 240, can be adjusted in the first and the second optical amplifiers and an output level of the optical amplifying part 240 can be adjusted in the optical attenuator. As an optical attenuator for adjusting the output level, an optical variable attenuator which is able to attenuate an input light to thereby output it and to change attenuation amount thereof is suitable. The optical variable attenuator might by a type which adjusts the attenuation amount by adding a magnetooptical crystal between the input light and an output light adding a polarizer to an output side of the magnetooptical crystal, and applying a magnetic field onto the magnetooptical crystal to change the strength of the magnetic field.

The WDM optical signal output from the optical amplifying part 240 is input to an optical multiplexer/demultiplexer (hereinafter abbreviated to 'W-CPL') 224 for multiplexing the wavelengths of two input rights.

Meanwhile, an OS 229, which, for example, has the same structure as that of an optical sender as previously described, generates an optical signal modulated by supervisory information (hereinafter abbreviated to 'OSC'). The supervisory information is information such as maintenance information and status information which are necessary in operating the optical communication system and includes at least an output level of the WDM optical signal output from the optical transmitting station 101. The OSC is set, for example, on a shorter wavelength side than ch. 1, which is a minimum channel of the WDM optical signal. However, the present invention is not limited to the OSC being set at such a wavelength. For example, the OSC may be set on a longer wave side than ch. m, which is a maximum channel of the WDM optical signal.

The OSC generated in the OS 229 is input to the W-CPL 224. The WCPL 224 multiplexes wavelengths of the WDM optical signal output from the optical amplifying part 240 and the OSC. The WDM optical signal whose wavelength is multiplexed with that of the OSC is input to the CPL 225 to be divided into two signals. The one of the divided signals is input to a PD 227 and the other is sent out to an optical transmission line 102-1 as an output of the optical transmitting station 101 to be transmitted to an optical repeater station 104-1 on a next stage.

The PD 227 photoelectrically converts input light and an output thereof is converted to a digital signal in an AD 230 and thereafter input to the CPU 231. The PD 227 detects the output level of the WDM optical signal output from the optical transmitting station 101.

The CPU 231 is connected to the A/Ds 228 and 230, the LD drive circuit 246, a memory 232, and the OS 229 to transmit/receive signals to/from each of the circuits. Based on an output of the AID 228 and an output of the A/D 230, the CPU 231 controls the optical amplifying part 240 to obtain a fixed gain and controls it to obtain a fixed output. The CPU-231 detects the output level of the WDM optical signal output from the optical transmitting station 101 based on the output of the AID 230, notifies the OS 229 of information on the output level, accommodates the information on the output level in the OSC, and notifies the optical repeater station 104-1 on the next stage of it.

The memory 232 is a storage circuit such as, for example, a semiconductor memory. Memory 232 stores control programs for controlling the optical amplifying part 240 and various data.

Incidentally, an optical isolator may be provided, for example, in some place between the MUX 222 and the CPL 225. For example, it may be provided between the EDF 242 and the CPL 241 or between the EDF 242 and the CPL 243. The optical isolator is an optical component which passes light therethrough only in one direction and it can be structured, for example, by disposing a Faraday rotator between two polarizers which are deviated by 45 degrees from each other. The optical isolator prevents reflected light which occurs in a connecting part and so on between each optical component in the optical transmitting station 101 from propagating without limit. Particularly, when the reflected light returns to the semiconductor laser, the semiconductor laser is induced by the reflected light with various phases and amplitudes, whereby an oscillation mode thereof is changed and a noise is generated. These adverse effects can be prevented by the optical isolator.

Next, the structure of the optical repeater station 104 is explained.

Figure 18:
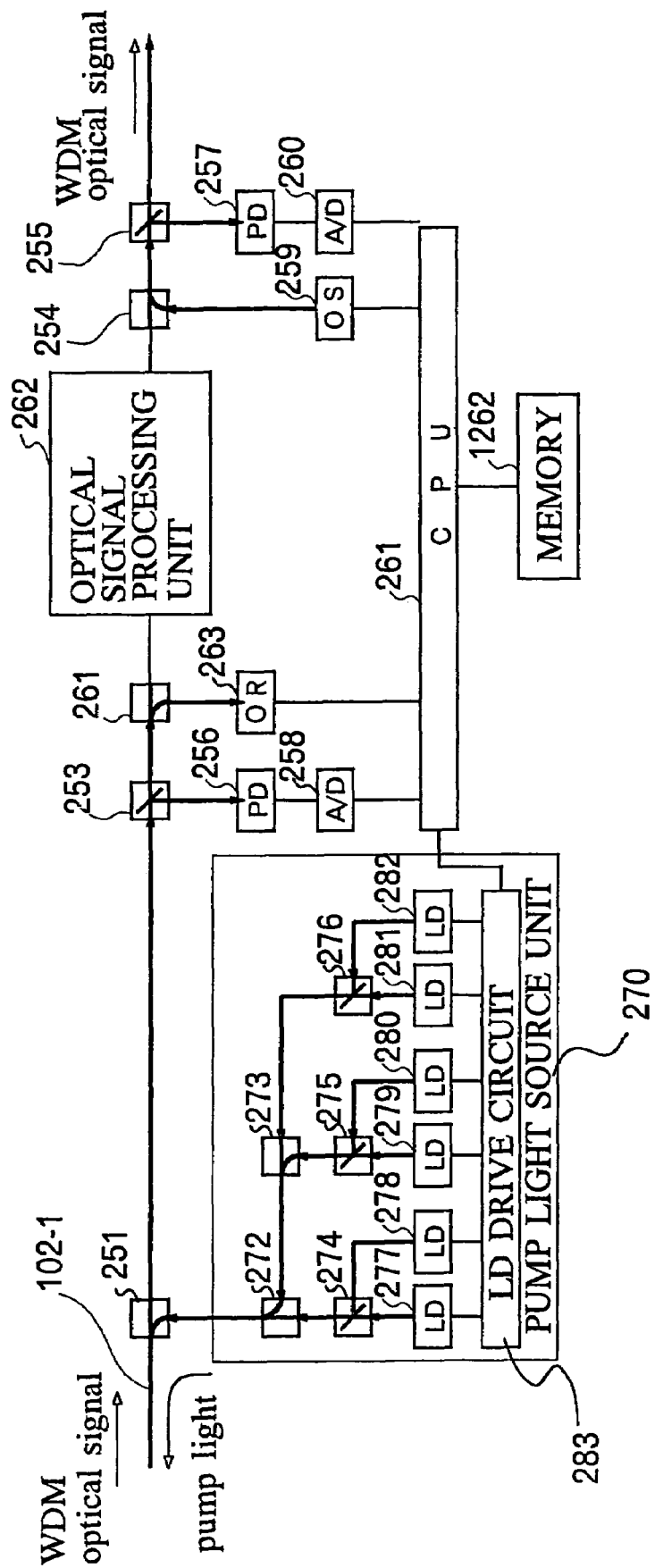
FIG. 18 is a diagram showing the structure of an optical repeater station in the optical communication system, according to an embodiment of the present invention.

FIG. 18 is a diagram showing the structure of the optical repeater station in the optical communication system. In FIG. 18, a WDM optical signal transmitted, for example, along the optical transmission line 102-1, is input to a CPL 253 via a W-CPL 251. Pump light output from a pump light source unit 270 is input to the W-CPL 251.

The pump light source unit 270, which is an optical circuit for supplying the optical transmission line 102-1 with the pump light used for distributed Raman amplification, is comprised of, for example, W-CPLs 272 and 273, polarization beam splitters (hereinafter abbreviated to 'PBS') 274 to 276, LDs 277 to 282, and an LD drive circuit 283.

Laser light output from the LD 277 and laser light output from the LD 278 are input to the PBS 274 and polarized/synthesized to be laser right having linear polarization constituents which cross at right angles with each other. Similarly, laser light output from the LD 279 and laser light output from the LD 280 are input to the PBS 275 to be polarized/synthesized and laser light output from the LD 281 and laser light output from the LD 282 are input to the PBS 276 to be polarized/synthesized.

The laser light polarized/synthesized in the PBS 275 and the laser light polarized/synthesized in the PBS 276 are input to the W-CPL 273 and wavelengths thereof are multiplexed. The laser light whose wavelengths are multiplied in the WCPL 273 and the laser right which is polarized/synthesized in the PD 274 are input to the W-CPL 272 and wavelengths thereof are multiplexed.

The laser light whose wavelengths are multiplexed in the W-CPL 272 is input as the pump light to the optical transmission line 102-1 via the W-CPL 251 and Raman-amplifies the WDM optical with the optical transmission line 102-1 serving as an amplifying medium.

Here, for example, as for oscillation wavelengths of the LDs 277 to 282 the LD 277 is set at a wavelength of 1422.0 nm, the LD 278 at a wavelength of 1426.0 nm, the LD 279 at a wavelength of 1433.0 nm, the LD 280 at a wavelength of 1437.0 nm, the LD 281 at a wavelength of 1459.5 nm, and the LD 282 at a wavelength of 1463.5 nm respectively in order to Raman-amplify the WDM optical signal in which each optical signal is arranged at 1529 nm to 1569 nm. When considering a gain as a function of wavelength in a case in which the Raman-amplification is performed by laser light with one wavelength, a gain as a function of wavelength in a case in which the Raman amplification is performed by the pump light including six wavelengths can be formed in a substantially linear shape at 1529 nm to 1569 nm by setting the oscillation wavelengths of the LDs 277 to 282 at these wavelengths. Of course, these are only example wavelengths, and the present invention is not limited to any specific wavelengths.

The LD drive circuit 283 outputs control signals to the LDs 277 to 282 respectively. The LD drive circuit 283 adjusts the element temperature of the LDs 277 to 282 to stabilize the oscillation wavelengths of the laser light Furthermore, the LD drive circuit 283 adjusts drive current of the LDs 277 to 282 based on a control signal of a CPU 261 to control optical power of the laser light so that a gain of the Raman amplification is controlled.

Incidentally, in FIG. 18, the pump light source unit 270 is comprised, for example, of six LDs 277 to 282 in order to obtain necessary pump right power and obtain a necessary gain as a function of wavelength, but the number of LDs may be determined according to the necessary pump light power and gain as a function of wavelength.

The WDM optical signal input to the CPL 253 is divided into two signals. One of the divided signals is input to a PD 256 and the other is input to a W-CPL 261.

The PD 256 photoelectrically converts the input light and an output thereof is input to the CPU 261 after converted to a digital signal in an A/D 258. The PD 256 detects an output level of the WDM optical signal input to the optical repeater station.

The W-CPL 261 demultiplexes wavelengths of the OSC and the WDM optical signal to output the OSC to an optical receiver (hereinafter abbreviated to 'OR') 263 and output the WDM optical signal to an optical signal processing unit 262. Therefore, a cutoff wavelength of the W-CPL 261 is set between wavelength bands of the OSC and the WDM optical signal. The OR 263 receives and processes the OSC to take out the supervisory information from the OSC and notifies the CPU 261 of the supervisory information. Thereby, the CPU 261 can obtain an output level of the optical transmitting station 101 on the preceding stage.

The optical signal processing unit 262 amplifies the WDM optical signal and/or adds/drops a predetermined optical signal (channel) to/from the WDM optical signal according to a function required by the optical repeater station 104-1.

The structure in the case of amplifying the WDM optical signal is the same as the structure of the optical amplifying part 240 which is described referring to FIG. 17, and therefore, the explanation thereof is omitted.

The structure in the case of adding/dropping is such that, for, example, in order to drop a predetermined optical signal to be dropped, a CPL for dividing the WDM optical into two, an optical signal rejecting part for rejecting a predetermined optical signal from the WDM optical signal which is output from the CPL, a W-CPL for adding an optical signal to be added to the WDM optical signal which is output from the optical signal rejecting part (with the predetermined optical signal being rejected) are provided. The optical signal rejecting part is structured by connecting in cascade optical filters, for example, fiber grating filters (hereinafter abbreviated to 'FBG'), in the number corresponding to a predetermined number of optical signals to be dropped. Reflected wavelength bands of the FBGs correspond to wavelengths of channels to be dropped respectively.

Incidentally, an acoustooptical tunable filter (AOTF) may be used, for example, as the optical signal rejecting part The acoustooptical tunable filter is an optical component which induces a refractive index change in an optical waveguide by an acoustooptical effect and rotates a polarization state of light which propagates through the optical waveguide to separate/select wavelength.

The structure in the case of carrying out both of the functions can be obtained by connecting each of the structures in cascade.

The WDM optical signal output from the optical signal processing unit 262 is input to a W-CPL 254.

Meanwhile, an OS259 generates the OSC and thereafter, inputs the OSC to the W-CPL 254. The OSC includes at least an output level of the WDM optical signal output from the optical repeater station 104-1.

The WCPL 254 multiplexes wavelengths of the WDM optical signal output from the optical signal processing unit 262 and the OSC. The WDM optical signal to which the wavelength of the OSC is multiplexed is input to a CPL 255 to be divided into two signals. One of the divided signals is input to a PD 257 and the other is sent out to an optical transmission fine 102-2 as an output of the optical repeater station 104-1 to be transmitted to an optical repeater station 104-2 on a next stage.

The PD 257 photoelectrically converts the input light and an output thereof is input to the CPU 261, after being converted to a digital signal in an AND 260. The PD 257 detects the output level of the WDM optical signal output from the optical repeater station 104-1.

The CPU 261 is connected to the A/Ds 258 and 260, the optical signal processing unit 262, a memory 1262, the OR 263, the OS 259 and the LD drive circuit 283 in the pump light source unit 270 to transmit/receive signals to/from these circuits. The CPU 261 controls the LD drive circuit 283 based on the output level of the optical transmuting station 101 on the preceding stage which is obtained from the OSC in the OR 263 while referring to an output of the AID 258 so that optical levels at both ends of the optical transmission line 102-1 become equal to each other or an optical level at an output end of the optical transmission line 102-1 becomes a predetermined value. The CPU 261 strengthens the pump light power by increasing the drive current of the LDs 277 to 282 when an input level does not reach the output level of the optical transmitting station 101 on the preceding stage, and weakens the pump light power by decreasing the drive current of the LDs 277 to 282 when the input level exceeds the output level of the optical transmitting station 101 on the preceding stage. The CPU 261 detects from the output of the AID 260 the output level of the WDM optical signal which is output from the optical repeater station 104-1 as a local station, notifies the OS 259 of information about this output level, accommodates the information about the output level in the OSC, and notifies the optical repeater station 104-2 on the next stage of it.

The memory 1262 stores, for example, control programs for controlling the pump light source unit 270 and various data.

In this way, in the optical communication system as shown in FIG. 3, the WDM optical signal is subsequently repeated in the plural optical repeater stations 104 from the optical transmitting station 101 and received in the optical receiving station 103. Here, each of the optical repeater stations 104 obtains an output level of the optical repeater station 104 on a preceding stage from the OSC, uses it for controlling the pump light source unit 270 of the own repeater station 104, accommodates the output level of the own repeater station 104 again in the OSC, and thereafter, notifies an optical repeater station 104 on a next station of it.

Next, the structure of the optical receiving station 103 is explained.

Figure 19:
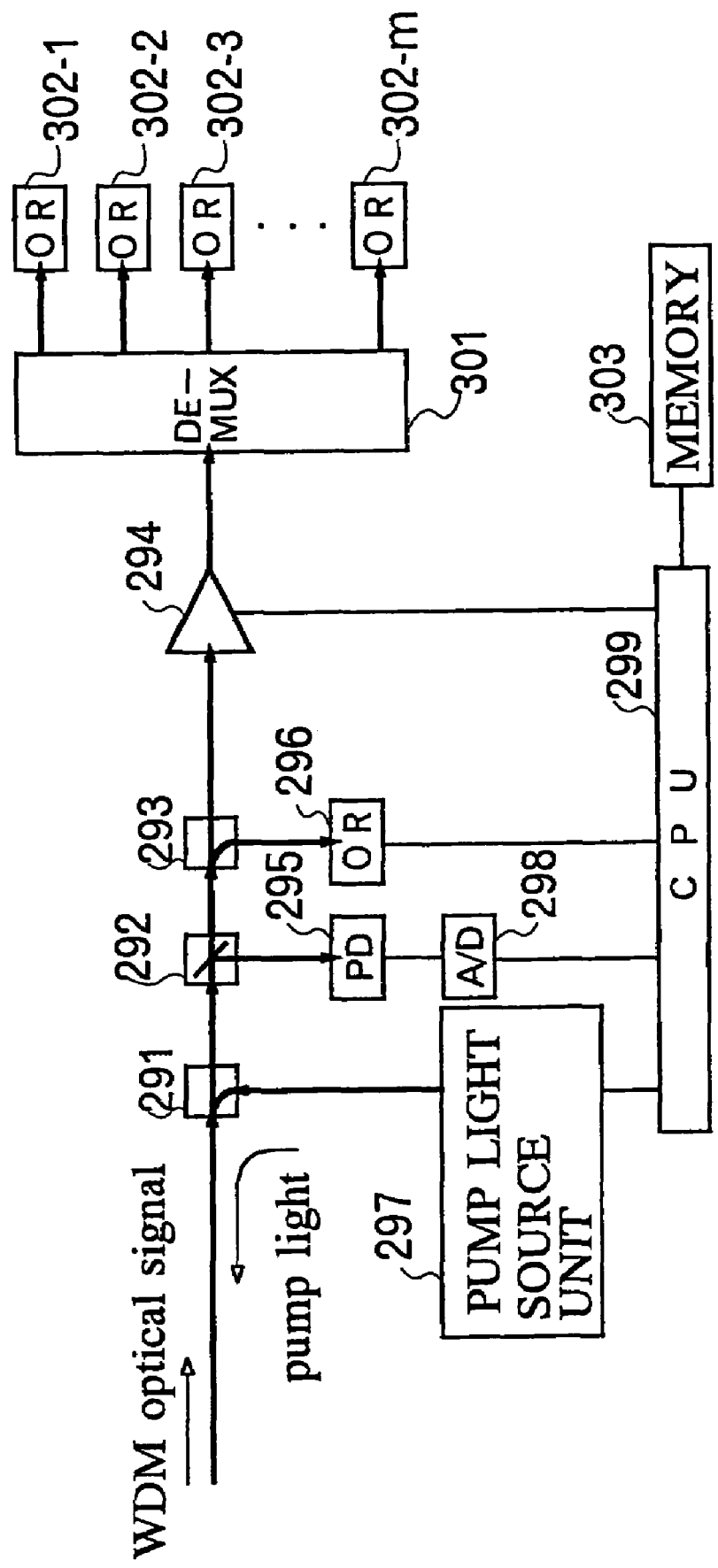
FIG. 19 is a diagram showing the structure of an optical receiving station in the optical communication system, according to an embodiment of the present invention.

FIG. 19 is a diagram showing the structure of the optical receiving station in the optical communication system.

In FIG. 19, a WDM optical signal transmitted to the optical receiving station 103 from an optical repeater station 104-*a* on a preceding stage via an optical transmission line 102-*a*+1 is input to a CPL 292 via a WCPL 291. To the W-CPL 291, pump light output from a pump right source unit 297 is input. The pump light source unit 297 is an optical circuit for supplying the optical transmission line 102-*a*+1 with the pump right for distributed Raman amplification and has the same structure, for example, as that of the pump light source unit 270, and therefore, the explanation thereof is omitted.

The WDM optical signal input to the CPL 292 is divided into two signals. One of the divided signals is input to a PD 295 and the other is input to a WCPL 293.

The PD295 photoelectrically converts the input light and an output thereof is input to a CPU 299 after being converted to a digital signal in an A/D 298. The PD 295 detects an output level of the WDM optical signal input to the optical receiving station 103.

The W-CPL 293 demultiplexes wavelengths of an OSC and the WDM optical signal to output the OSC to an OR 296 and output the WDM optical signal to an optical amplifying part 294. Therefore, a cutoff wavelength of the W-CPL 293 is set between the wavelength of the OSC and the wavelength band of the WDM optical signal. The OR 296 receives and processes the OSC to take out supervisory information from the OSC and notifies the CPU 299 of the supervisory information. Thereby, the CPU 299 can obtain the output level of the optical transmitting station 104-*a* on a preceding stage.

The optical amplifying part 294 is an optical circuit for amplifying the WDM optical signal to a predetermined optical level and has the same structure as that of the optical amplifying part 240 which is described referring to FIG. 17 and therefore, the explanation thereof is omitted.

The WDM optical signal output from the optical amplifying part 294 is input to an optical demultiplexer (hereinafter abbreviated to 'DEMUX') 301 for demultiplexing light to each wavelength. The DEMUX 301 demultiplexes the WDM optical signal to each optical signal corresponding to each channel. The demultiplexed optical signals corresponding to respective channels are input to ORs 302-1 to 302-*m* respectively to be received/processed. Each of the ORs 302 is composed of, for example, an optical receiving part such as a photodiode, an equalization amplifier for equalizing an output of the optical receiving part, a timing circuit for extracting a timing from an output of the equalization amplifier, and a discriminating circuit for taking out a signal from the output of the equalization amplifier at the timing of the timing circuit.

The CPU 299 is connected to the AD 298, the pump light source unit 297, the optical amplifying part 294, and a memory 303 to transmit/receive signals to form these devices. The CPU 299 controls the LD drive circuit 283 in the pump light source unit 270 in based on an output of the AND 298.

The memory 303 stores control programs for controlling the pump light source unit 297 and various data.

As an example, a dielectric multilayered film filter which is one of interference filters, an arrayed waveguide grating, and so on can be utilized as the MUX, the DEMUX or the W-CPL.

As shown in FIG. 4A, each of the optical transmission lines which connects each section between the optical transmitting station 101, each of the optical repeater stations 104, and the optical receiving station 103 includes, in each section, the first optical transmission line 102-L1 with a small characteristic value, the second optical transmission line 102-L2 with a large characteristic value, and the third optical transmission line 102-L3 with a small characteristic value in sequence from a transmitting side to a receiving side. As the first optical transmission line 102-L1 and the third optical transmission line 102-L3, for example, a single mode optical fiber can be used and, as the second optical transmission line 102-L2, for example, a wavelength dispersion shift optical fiber can be used.

Here, mode field diameters are different from each other due to difference in characteristic values.

Figure 20A:
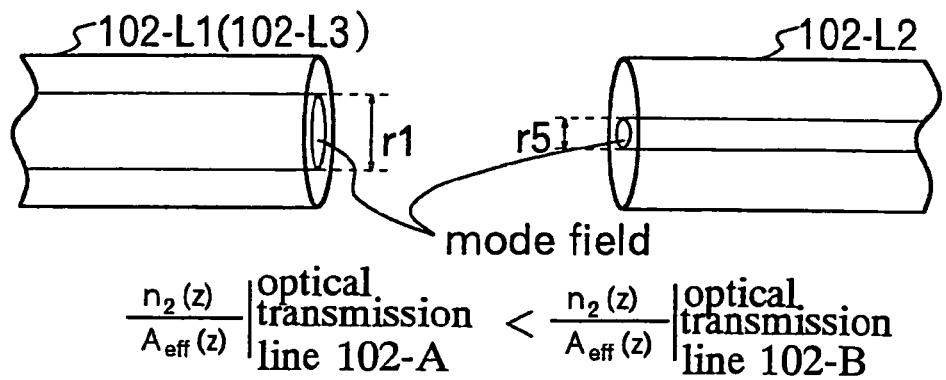
FIGS. 20A, 20B and 20C are views showing examples of mode conversion splicing, according to an embodiment of the present invention.
Figure 20B:
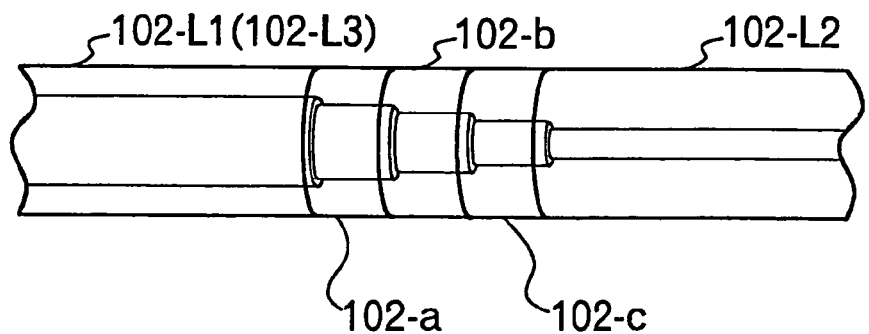
Figure 20C:
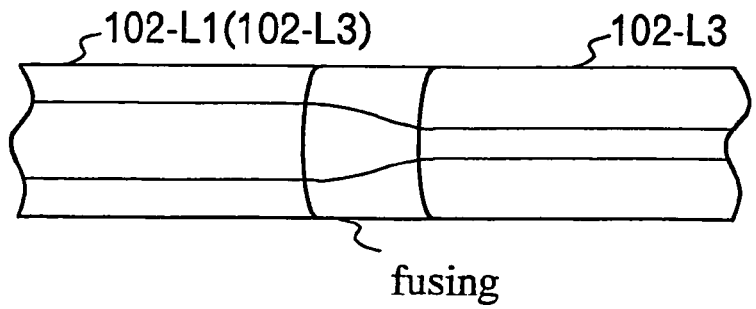
Figure 21:
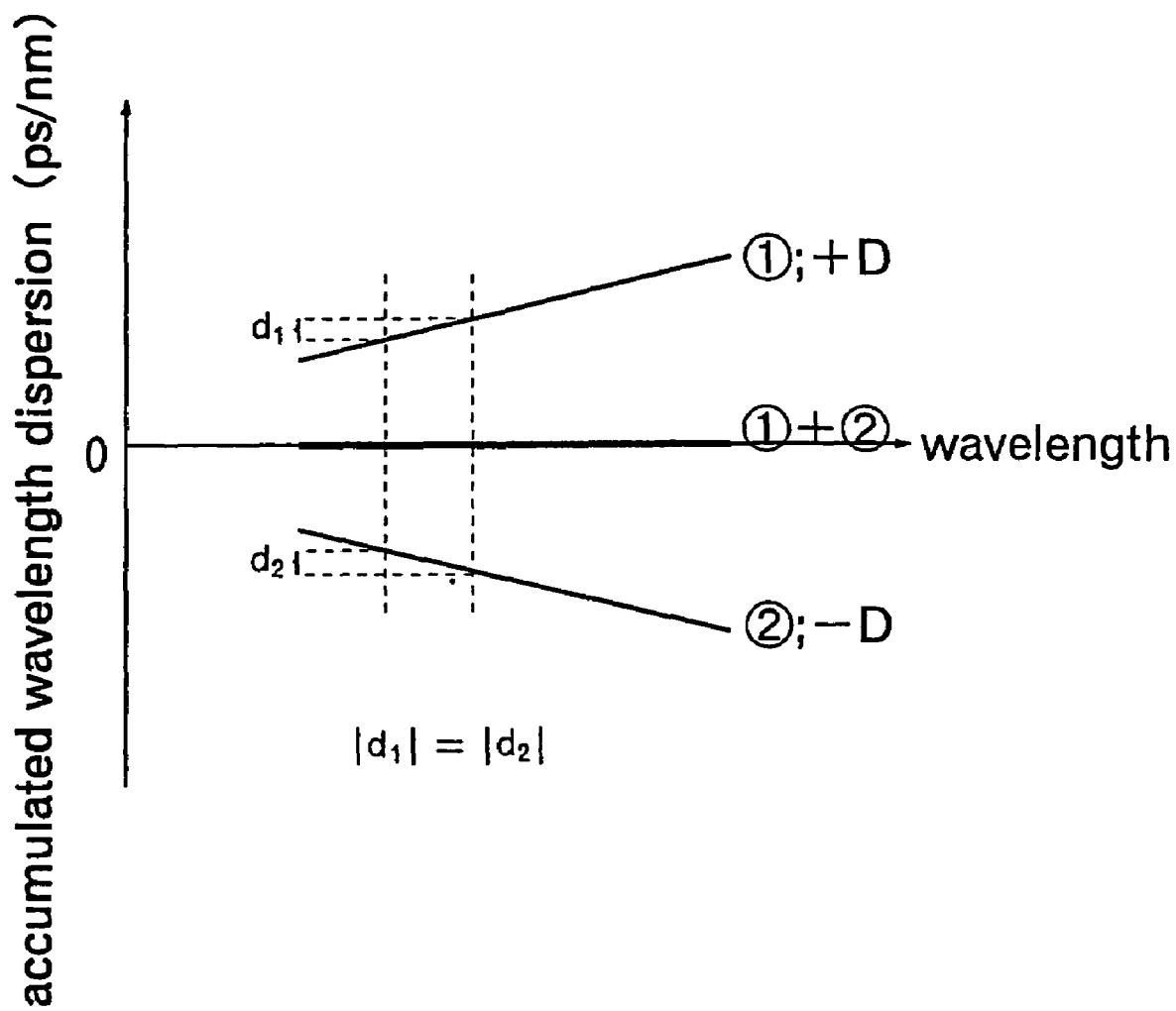
FIG. 21 an explanatory chart showing a wavelength dispersion slope, according to an embodiment of the present invention.

FIGS. 20A, 20B and 20C are views showing examples of mode conversion splicing.

In FIG. 20A, an optical fiber with a small characteristic value has a larger mode field diameter (r1) than a mode field diameter (r5) of an optical fiber with a large characteristic value (r1>r5). Therefore, when the first optical transmission line 102-L1 (the third optical transmission line 102-L3) and the second optical transmission line 102-L2 are simply connected, a large amount of connection loss is caused due to difference in mode field diameter.

Herein, as shown in FIG. 20B, a single or a plural of, for example, three optical transmission lines with different mode field diameters for connecting parts are prepared and with the use of optical transmission lines 102-*a* to 102-*c* the mode field diameters are changed step by step to connect the optical transmission lines. Alternately, as shown in FIG. 20C, they may be connected with each other with the mode field diameters being changed step by step by fusing the connecting parts.

In order to compensate the wavelength dispersion of the optical transmission line 102, it is suitable that an absolute value of a wavelength dispersion slope di of the first optical transmission line 102-L1 (the third optical transmission line 102-L3) and an absolute value of a wavelength dispersion slope $d_2$ of the second optical transmission line 102-L2 are made almost equal to each other so that the wavelength dispersion slope of the optical transmission line 102 becomes almost zero.

Next, the structure of a bi-directional optical communication system is explained.

FIGS. 22A and 22B are diagrams showing the structure of the bi-directional optical communication system. Referring now to FIGS. 22A and 22B, the bi-directional optical communication system includes optical transmitting/receiving stations 111-A and 111-B for generating a WDM optical signal of a plurality of waves in the number of m and receiving/processing the transmitted WDM optical signal, optical fiber cables 112-1 through 112-*a*+1, each of which is comprised of optical fibers (see 122-L1, 122-L2 and 122-L3 in FIG. 22B) for transmitting an upward WDM optical signal therethrough between the optical transmitting/receiving stations 111-A and 111-B and serving as optical amplifying media, and optical fibers (see 123-L1, 123-L2 and 123-L3 in FIG. 22B) for transmitting a downward WDM optical signal therethrough and serving as optical amplifying media.

Furthermore, in the bi-directional optical communication system, optical repeater stations (such as optical repeater stations 114-1 to 114-a in FIG. 22A) are connected between each of the optical fiber cables. The plural optical repeater stations 114-1 to 114-a are provided between each of the optical fiber cables 112-1 to 112-a+1.

Figure 2A:
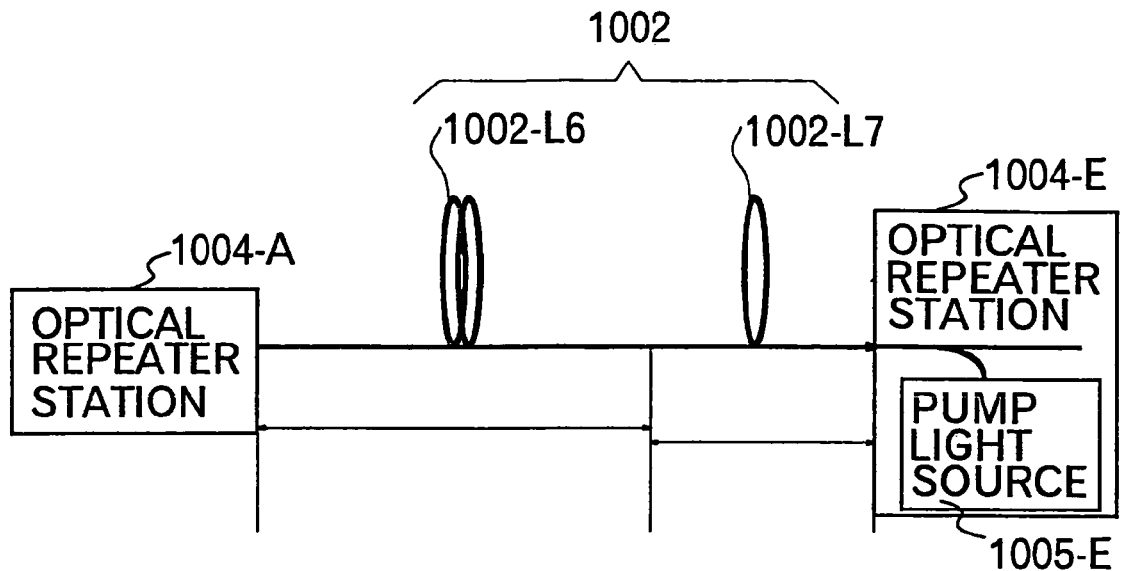
FIGS. 2A and 2B are diagrams showing the structures of conventional loss compensated/distributed Raman amplifiers.
Figure 2B:
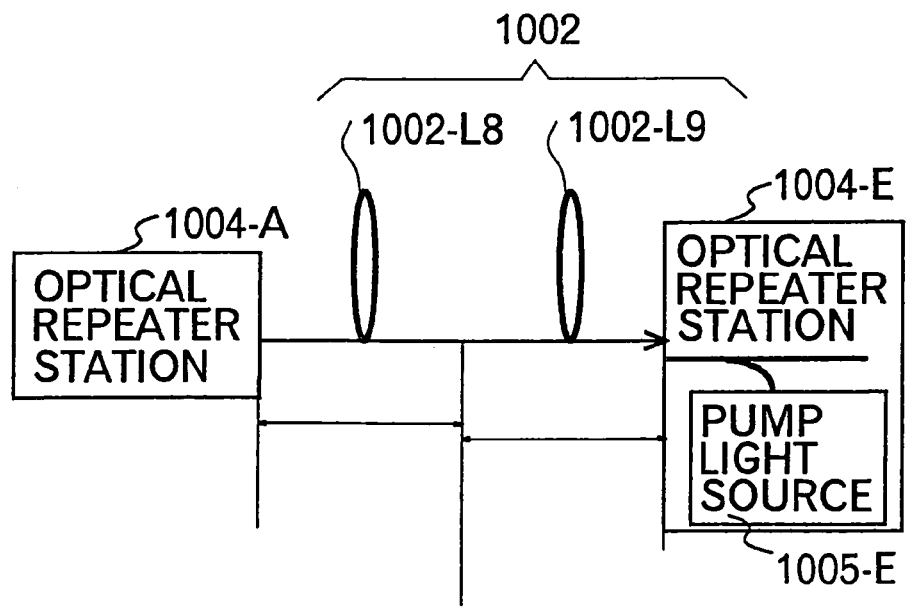

Each optical repeater station 114-1 to 114-a typically includes a pump light source for supplying pump light for distributed optical amplification. For example, as shown in FIG. 2B, optical repeater stations 114-A and 114-B are adjacent to each other along the transmission line. Optical repeater station 114-A includes pump right source units 270-Aa and 270-Ab for supplying cables with pump light for distributed optical amplification. Similarly, optical repeater station 114-B includes pump light source units 270-Ba and 270-Bb for supplying cables with pump light for distributed optical amplification. The pump right source units 270 would typically also be provided in the optical transmitting/receiving stations 111-A and 111-B.

Each of the optical transmission/receiving stations 111-A and 111-B can be structured, for example, by combining the optical transmitting station 101 and the optical receiving station 103 as described above. Each of the optical repeater stations 114-a through 114-a can be structured, for example, by combining two optical repeater stations 104 as described above Each of the optical fiber cable accommodates therein a plurality of optical fiber core fibers being tied together and is basically structured by including the optical fiber core fibers, high tensile material, and an outer cover. The optical fiber core fibers are optical fibers covered with protective material such as, for example, nylon. The high tensile material prevents extension of the optical fibers which is caused by tension when the optical fiber cable is laid so that excessive extension does not occur in the optical fibers. Various optical fiber cables are being developed from the viewpoint of transmission characteristics, laying operability, and connecting operability, and, for example, a nylon core fiber unit cable, a loose tube cable, a slot cable, and a ribbon slot cable are among them.

As shown in FIG. 22B, the optical fiber 122 for transmitting the upward WDM optical signal therethrough is comprised of a first optical fiber 122-L1 which has a small characteristic value, a second optical fiber 122-L2 which is connected to the first optical fiber 122-L1 and has a large characteristic value, and a third optical fiber 122-L3 which is connected to the second optical fiber 122-L2 and has a small characteristic value. The first optical fiber 122-L1 is connected to an optical repeater station 114-A which is disposed on the upstream side of the transmission direction of the WDM optical signal, and the third optical fiber 122-L3 is connected to an optical repeater station 114-B which is disposed on the downstream side of the transmission direction of the WDM optical signal.

Meanwhile, as shown in FIG. 22B, the optical fiber 123 for transmitting the downward optical signal is comprised of a first optical fiber 123-L1 which has a small characteristic value, a second optical fiber 123-L2 which is connected to the first optical fiber 123-L1 and has a large characteristic value, and a third optical fiber 123-L3 which is connected to the second optical fiber 123-L2 and has a small characteristic value. The first optical fiber 123-L1 is connected to the optical repeater station 114-B which is disposed on the upstream side of the transmission direction of the WDM optical signal and the third optical fiber 123-L3 is connected to the optical repeater station 114-A which is disposed on the downstream side of the transmission direction of the WDM optical signal.

In the bi-directional optical communication system as described above, the optical fibers 122 and 123 whose characteristic values are larger in middle fields thereof than characteristic values in fields other than the middle fields are used to transmit a WDM optical signal and to Raman-amplify the WDM optical signal. The wavelength dispersion, the transmission loss, and the nonlinear optical effect can be compensated in a well-balanced manner as a whole and the optical SNR can be improved most.

Furthermore, due to its symmetric characteristic, a length of the optical fiber 122-L1 and a length of the optical fiber 123-L3, a length of the optical fiber 122-L2 and a length of the optical fiber 123-L2, and a length of the optical fiber 122-L3 and a length of the optical fiber 123-L1 can be made equal to each other, respectively, so that the optical fiber cable can be manufactured easily.

The distributed optical amplifying apparatus, the optical communication station, the optical communication system, and the optical fiber cable according to the present invention can compensate the wavelength dispersion, the transmission loss, and the nonlinear optical effect in a well-balanced manner as a whole and also improve the optical SNR most.

Therefore, the transmission distance can be lengthened compared with that in a conventional art.

According to various of the above embodiments of the present invention, a distributed optical amplifying apparatus includes an optical fiber whose characteristic value in a middle field thereof is larger than characteristic values in fields other than the middle field when a value of a nonlinear refractive index divided by an effective cross section is supposed to be a characteristic value, and a pump light source for supplying pump light to the optical fiber.

Further, according to various embodiments of the present invention, a distributed optical amplifying apparatus includes an optical fiber which is comprised of a first optical fiber which has a first characteristic value, a second optical fiber which is connected to the first optical fiber and has a second characteristic value larger than the characteristic value of the first optical fiber, and a third optical fiber which is connected to the second optical fiber and has a third characteristic value smaller than the characteristic value of the second optical fiber. The characteristic value is a nonlinear refractive index divided by an effective cross section. A pump light source supplies pump light to the optical fiber.

Moreover, according to embodiments of the present invention, an optical communication station includes a processing device for performing predetermined processing for an optical signal, an optical fiber which is connected to the processing device and is composed of a first optical fiber having a first characteristic value, a second optical fiber which is connected to the first optical fiber and has a second characteristic value larger than the characteristic of the first optical fiber, and a third optical fiber which is connected to the second optical fiber and has a third characteristic value smaller than the characteristic value of the second optical-fiber. The characteristic value is a nonlinear refractive index divided by an effective cross section. The optical communication station also includes a pump right source supplying pump light to the optical fiber.

In addition, according to above embodiments of the present invention, an optical communication system includes a first station and a second station for performing predetermined processing for an optical signal. The optical communication system also includes an optical transmission line for connecting the first station and the second station. The optical transmission line is an optical fiber composing of a first optical fiber which has a first characteristic value, a second optical fiber which is connected to the first optical fiber and has a second characteristic value larger than the characteristic value of the first optical fiber, and a third optical fiber which is connected to the second optical fiber and has a third characteristic value smaller than the characteristic value of the second optical fiber. The characteristic value is a nonlinear refractive index divided by an effective cross section. A pump light source supplies pump light to the optical fiber.

According to various embodiments of the present invention, by an optical fiber cable includes a plurality of optical fibers having characteristic values in middle fields thereof larger than characteristic values in fields other than the middle fields, wherein the characteristic value is a nonlinear refractive index divided by an effective cross section.

According to embodiments of the present invention, a distributed optical amplifying apparatus, an optical communication station, an optical communication system, and an optical fiber cable as described above are provided with an optical fiber having a specific structure as described above so that the wavelength dispersion, the transmission loss, and the nonlinear optical effect can be compensated in a well-balanced manner as a whole and the optical SNR can be improved. As a result, transmission distance can be lengthened compared with that in the conventional art.

Various values or levels are described herein as being almost equal to each other, thereby indicating that the values or levels are substantially equal.

Various embodiments of the present invention relate to a fiber line including a plurality of optical fibers connected together. For example, in various embodiments of the present invention, such as in FIG. 4A, an optical transmission line 102 includes first, second and third optical fibers 102-L1, 102-L2 and 102-L3 connected together. The term "fiber line" is simply intended to indicate an optical fiber (such as optical transmission line 102) formed of a plurality of optical fibers connected together, and is not limited to being a "transmission" line for an optical communication system.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An optical fiber cable comprising:
   first, second and third optical fibers connected together so that signal light traveling through the cable travels through the first optical fiber, then through the second optical fiber and then through the third optical fiber, wherein
   the second optical fiber has a negative dispersion value,
   the first and third optical fibers each have a positive dispersion value,
   the cable optically connects together two optical repeater stations, or an optical repeater station and an end station,
   pump light is provided to the first, second and third optical fibers by inputting the pump light from an input side of the first optical fiber and an output side of the third optical fiber, so that the pump light is not provided directly to the second optical fiber and is instead provided to the second optical fiber by passing through the first optical fiber or the third optical fiber, to cause Raman amplification to occur in the first, second and third optical fibers,
   the first and third optical fibers each have an effective area from 55 square microns to 120 square microns and the second optical fiber has an effective area from 15 square microns to 45 square microns, and
   lengths of the first, second and third fibers are set, and the pump light is provided at a level, so that power level at the input side of the first optical fiber of the signal light traveling through the cable is substantially equal to power level of the signal light at the output side of the third optical fiber.

2. The optical fiber cable according to claim 1, wherein the first and third optical fibers have zero dispersion values in 1.3µ bands.

3. The optical fiber cable according to claim 1, further comprising:
   a connection part between the first and second optical fibers and connecting the first and second optical fibers together, the connection part comprising at least one optical fiber having an effective area of a size between the sizes of the effective areas of the first and second optical fibers.

4. An optical fiber cable comprising:
   first, second and third optical fibers connected together so that signal light traveling through the cable enters an input end of the first optical fiber, then travels through the first optical fiber, then through the second optical fiber and then through the third optical fiber, to thereby be output from an output end of the third optical fiber, wherein
   the second optical fiber has a negative dispersion value,
   the first and third optical fibers each have a positive dispersion value,
   the cable optically connects together two optical repeater stations, or an optical repeater station and an end station,
   pump light is provided to the first, second and third optical fibers to cause Raman amplification to occur in the first, second and third optical fibers, and
   the provided pump light is at a level so that loss of the signal light travelling through the first, second and third optical fibers is compensated by Raman amplification occurring in the first, second and third optical fibers, and so that an optical signal level of the signal light at the input end of the first optical fiber is substantially equal to an optical signal level of the signal light at the output end of the third optical fiber.

5. An apparatus comprising:
   an optical fiber cable comprising first, second and third optical fibers connected together so that signal light traveling through the cable enters an input end of the first optical fiber, then travels through the first optical fiber, then through the second optical fiber and then through the third optical fiber, to thereby be output from an output end of the third optical fiber, wherein
   the second optical fiber has a negative dispersion value,
   the first and third optical fibers each have a positive dispersion value, and
   the cable optically connects together two optical repeater stations, or an optical repeater station and an end station;

means for providing pump light to the first, second and third optical fibers to cause Raman amplification to occur in the first, second and third optical fibers; and means for causing the provided pump light to be at a level so that loss of the signal light traveling through the first, second and third optical fibers is compensated by Raman amplification occurring in the first, second and third optical fibers, and so that an optical signal level of the signal light at the input end of the first optical fiber is substantially equal to an optical signal level of the signal light at the output end of the third optical fiber.

* * * * *